US009894979B2

(12) United States Patent
Irie

(10) Patent No.: US 9,894,979 B2
(45) Date of Patent: Feb. 20, 2018

(54) DRAWING APPARATUS AND DRAWING METHOD FOR DRAWING APPARATUS

(71) Applicant: CASIO COMPUTER CO., LTD., Shibuya-ku, Tokyo (JP)

(72) Inventor: Tamotsu Irie, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/268,487

(22) Filed: Sep. 16, 2016

(65) Prior Publication Data

US 2017/0071314 A1 Mar. 16, 2017

(30) Foreign Application Priority Data

Sep. 16, 2015 (JP) ................................ 2015-182992
Jun. 28, 2016 (JP) ................................ 2016-127135

(51) Int. Cl.

| | |
|---|---|
| ***G06K 15/22*** | (2006.01) |
| ***A45D 29/22*** | (2006.01) |
| ***F26B 21/12*** | (2006.01) |
| ***F26B 21/10*** | (2006.01) |
| ***F26B 3/04*** | (2006.01) |
| ***F26B 9/06*** | (2006.01) |
| ***B41J 2/01*** | (2006.01) |
| ***B41J 3/407*** | (2006.01) |

(Continued)

(52) U.S. Cl.
CPC ................ *A45D 29/22* (2013.01); *B41J 2/01* (2013.01); *B41J 3/407* (2013.01); *B41J 11/002* (2013.01); *F26B 3/04* (2013.01); *F26B 9/06* (2013.01); *F26B 21/10* (2013.01); *F26B 21/12* (2013.01); *A45D 2029/005* (2013.01)

(58) Field of Classification Search
None
See application file for complete search history.

(56) References Cited

U.S. PATENT DOCUMENTS 4,193,209 A * 3/1980 Lovison ................ A45D 29/18
34/202
4,206,556 A * 6/1980 Sabo ..................... A45D 29/18
132/73.5

(Continued)

FOREIGN PATENT DOCUMENTS

JP 2009029009 A 2/2009
JP 2009184165 A 8/2009

(Continued)

*Primary Examiner* — Ted Barnes
(74) *Attorney, Agent, or Firm* — Holtz, Holtz & Volek PC

(57) ABSTRACT

A drawing apparatus and a drawing method for a drawing apparatus whereby only an amount of drying necessary to dry the ink can be efficiently performed, and both high-definition drawing and expedited drawing processing can be realized.

The drawing apparatus includes a drawing unit 40 that performs a drawing on a surface of a nail T by applying ink to the surface of the nail T, and a fan 92; a drying unit 90 that performs a drying operation for drying the ink applied to the surface of the nail T; a drying condition determination portion 813 that determines a drying condition for the drying unit 90; and a drying control portion 814 that controls the drying operation of the drying unit 90 in accordance with a determination by the drying condition determination portion 813.

12 Claims, 14 Drawing Sheets

(51) Int. Cl.
*B41J 11/00* (2006.01)
*A45D 29/00* (2006.01)

(56) References Cited

U.S. PATENT DOCUMENTS

| | | | | |
|---|---|---|---|---|
| 5,130,551 | A * | 7/1992 | Nafziger | A45D 29/18 118/642 |
| 5,249,367 | A * | 10/1993 | Nafziger | A45D 29/18 34/202 |
| 5,424,061 | A * | 6/1995 | Pappas | A61K 8/731 424/401 |
| 5,428,384 | A * | 6/1995 | Richtsmeier | B41J 2/04515 347/102 |
| 6,352,699 | B1 * | 3/2002 | Mondet | A61K 8/042 424/401 |
| 6,527,356 | B1 * | 3/2003 | Spurr | B41J 29/393 347/104 |
| 8,450,705 | B1 * | 5/2013 | Chen | F26B 3/28 250/492.1 |
| 2003/0067504 | A1 * | 4/2003 | Spurr | B41J 11/009 347/19 |
| 2003/0200977 | A1 * | 10/2003 | Hu | A45D 29/20 132/73 |
| 2003/0200978 | A1 * | 10/2003 | Hu | A45D 29/00 132/73 |
| 2004/0181967 | A1 * | 9/2004 | Fujinami | F26B 13/10 34/620 |
| 2004/0250443 | A1 * | 12/2004 | Delaney | A45D 29/00 34/275 |
| 2008/0180477 | A1 * | 7/2008 | Trombley | B41J 11/009 347/16 |
| 2009/0267260 | A1 * | 10/2009 | Nakamura | B29C 41/28 264/217 |
| 2010/0073409 | A1 * | 3/2010 | Zawacki | G06F 3/0488 347/6 |
| 2010/0196294 | A1 * | 8/2010 | Amato | A61K 8/11 424/61 |
| 2011/0050779 | A1 * | 3/2011 | Maru | B41J 3/60 347/16 |
| 2013/0235137 | A1 * | 9/2013 | Nakayama | A45D 29/00 347/102 |
| 2014/0002559 | A1 * | 1/2014 | Taya | B41J 11/002 347/102 |
| 2014/0043418 | A1 * | 2/2014 | Yamaura | B41J 11/002 347/102 |
| 2014/0329001 | A1 * | 11/2014 | Rouaud | B05B 12/084 427/9 |
| 2015/0138264 | A1 * | 5/2015 | Yamasaki | B41J 3/407 347/9 |
| 2015/0299952 | A1 * | 10/2015 | Kalaniemi | D21G 5/00 348/88 |
| 2015/0372338 | A1 * | 12/2015 | Tsuchiya | H01M 4/13 429/94 |
| 2016/0332462 | A1 * | 11/2016 | Harayama | B41J 11/0015 |

FOREIGN PATENT DOCUMENTS

| | | | |
|---|---|---|---|
| JP | 2009298044 | A | 12/2009 |
| JP | 2013188348 | A | 9/2013 |
| JP | 2014008675 | A | 1/2014 |

* cited by examiner

DRAWING APPARATUS AND DRAWING METHOD FOR DRAWING APPARATUS

CROSS-REFERENCE TO RELATED APPLICATIONS

This application is based upon and claims the benefit of priority from the prior Japanese Patent Application No. 2015-182992, filed Sep. 16, 2015, the entire contents of which are incorporated herein by reference.

BACKGROUND OF THE INVENTION

1. Field of the Invention

The present invention relates to a drawing apparatus and a drawing method for a drawing apparatus.

2. Description of the Related Art

Conventionally, drawing apparatuses for drawing desired nail designs on nails of human fingers are known.

In cases where performing nail printing by using such a drawing apparatus, if the finger is removed from within the apparatus immediately after performing the drawing, the ink may adhere to the interior or exterior of the apparatus and/or the hand or clothing of the user, resulting in the soiling of the apparatus and/or the hand or rubbing off or ruining of the newly applied nail design.

As such, it is preferable that, after the application of the drawing, the ink be dried using a dryer or similar mechanism and, then, the finger be removed.

Additionally, there are cases in which, in order to finish one nail design, first a white ink or similar base layer is applied to the nail, then a pattern or similar design is drawn thereon, and then transparent ink or a similar topcoat is further applied thereon. In these cases, unless the ink is dried at each step, the ink subsequently applied thereon may mix or run in the previously applied ink, or the pattern that has been drawn may run, resulting in an unattractive finish.

On this point, Japanese Unexamined Patent Application Publication No. 2014-008675, for example, describes an ink jet apparatus including a blowing mechanism that generates wind. In this ink jet apparatus, wind generated by the blowing mechanism is blown on a recording region where a recording head discharges ink on a sheet and, thus, performs drying of the ink on the sheet.

Japanese Unexamined Patent Application Publication No. 2014-008675 describes that it is possible to dry the area where the ink has been applied by providing the drawing apparatus with such a blowing mechanism.

However, in the case described above, the nail is a sheet and, in contrast thereto, in cases where the drawing apparatus performs drawing on nails, the user may experience discomfort such as drying of the fingertips or the like if unnecessary drying is performed.

Moreover, in cases where ink is easily dried such as when the region drawn on is narrow or the nail is small, when drawing using a quick-drying ink, or the like, there have been problems in that time to complete the drying operation is unnecessarily lengthened, efficient drawing cannot be performed, and power consumption is wastefully increased when the same drying operations are uniformly applied.

In light of the foregoing, an object of the present invention is to provide a drawing apparatus and a drawing method for a drawing apparatus whereby only an amount of drying necessary to dry the ink can be efficiently performed, and both high-definition drawing and expedited drawing processing can be realized.

SUMMARY OF INVENTION

In order to solve the problems described above, a drawing apparatus and a drawing method for a drawing apparatus of the present invention provide the following resolution means.

A drawing apparatus includes a drawing unit that performs a drawing on at least one nail of a finger or toe by applying a liquid material to the nail, a dryer that performs a drying operation for drying the liquid material that has been applied to the nail, and a processor that determines a drying condition for the dryer and controls the drying operation of the dryer in accordance with the determination of the drying condition.

A drawing method for a drawing apparatus including a drawing unit that performs a drawing on at least one nail of a finger or toe by applying a liquid material to the nail, and a dryer that performs a drying operation for drying the liquid material applied to the nail includes determining a drying condition for the dryer before drawing by the drawing unit, and controlling the drying operation of the dryer in accordance with the determination of the drying condition.

According to the present invention, the amount of drying necessary to dry the ink can be efficiently performed, and both high-definition drawing and expedited drawing processing can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7A corresponds to a first scan from left to right in FIG. 6. FIG. 7B corresponds to a second scan from right to left in FIG. 6. FIG. 7C corresponds to a third scan from left to right in FIG. 6.

FIG. 8A illustrates a case where the ink application range is large. FIG. 8B illustrates a case where the ink application range is medium. FIG. 8C illustrates a case where the ink application range is small.

FIG. 12A illustrates a case where the ink application amount is large. FIG. 12B illustrates a case where the ink application amount is medium. FIG. 12C illustrates a case where the ink application amount is small.

DETAILED DESCRIPTION OF THE INVENTION

First Embodiment

Figure 1B:
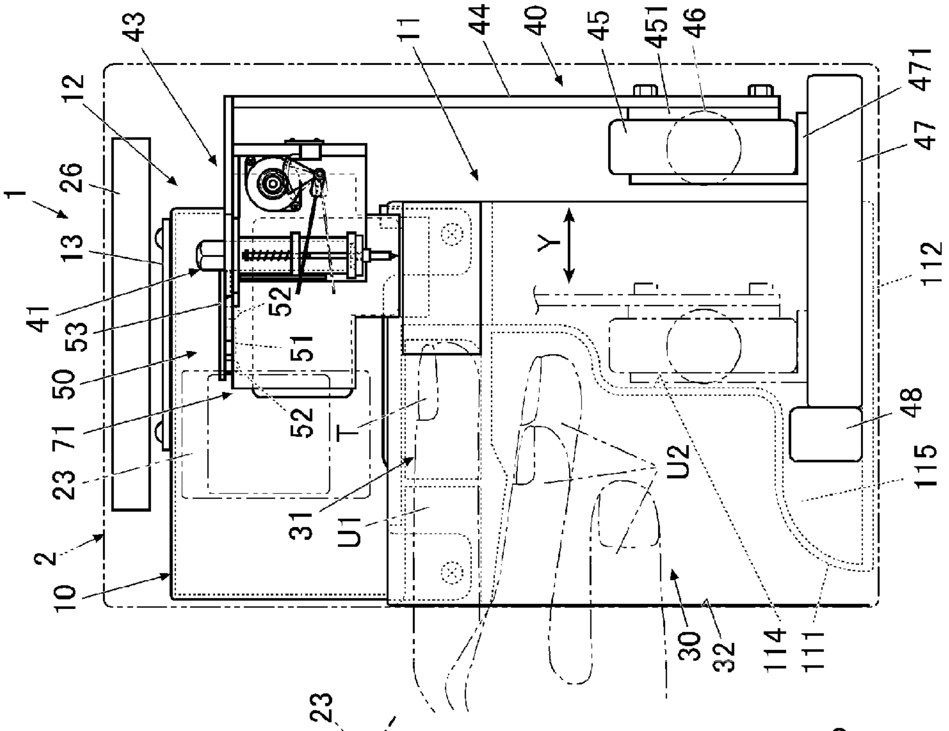
FIG. 1B is a side view illustrating an internal configuration of the drawing apparatus illustrated in FIG. 1A.

A first embodiment of the nail printing apparatus (drawing apparatus) and drawing method for the nail printing apparatus (drawing apparatus) according to the present invention are described below while referring to FIGS. 1A to 5.

While various limitations, which are technically preferable from the perspective of carrying out the present invention, are placed on the embodiments described below, the scope of the present invention should not be construed to be limited to these embodiments or the examples illustrated in the drawings.

In the following embodiments, a nail printing apparatus 1 will be described as an apparatus for drawing on a drawing object (at least one nail of a finger or toe), namely the surface of a fingernail. However, the drawing object is not limited to the surfaces of fingernails and, for example, may be the surface of a toenail.

Figure 1A:
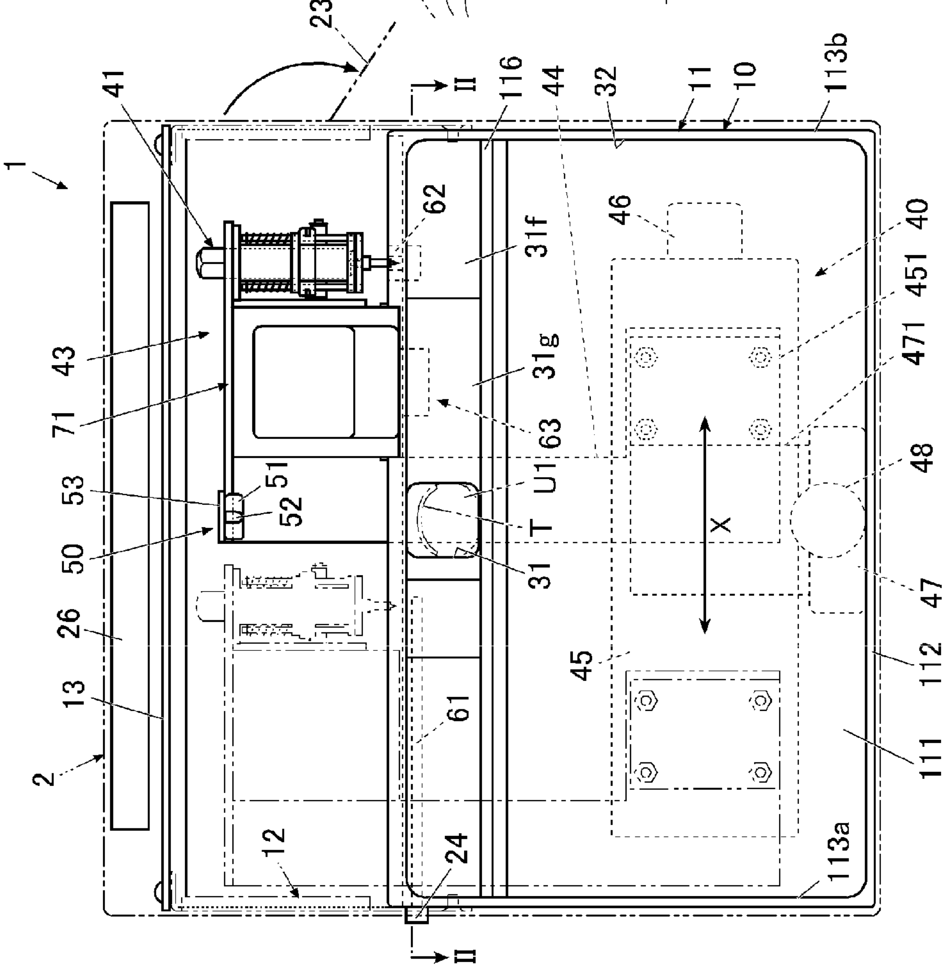
FIG. 1A is a front view of a drawing apparatus according to an embodiment of the present invention.
Figure 2A:
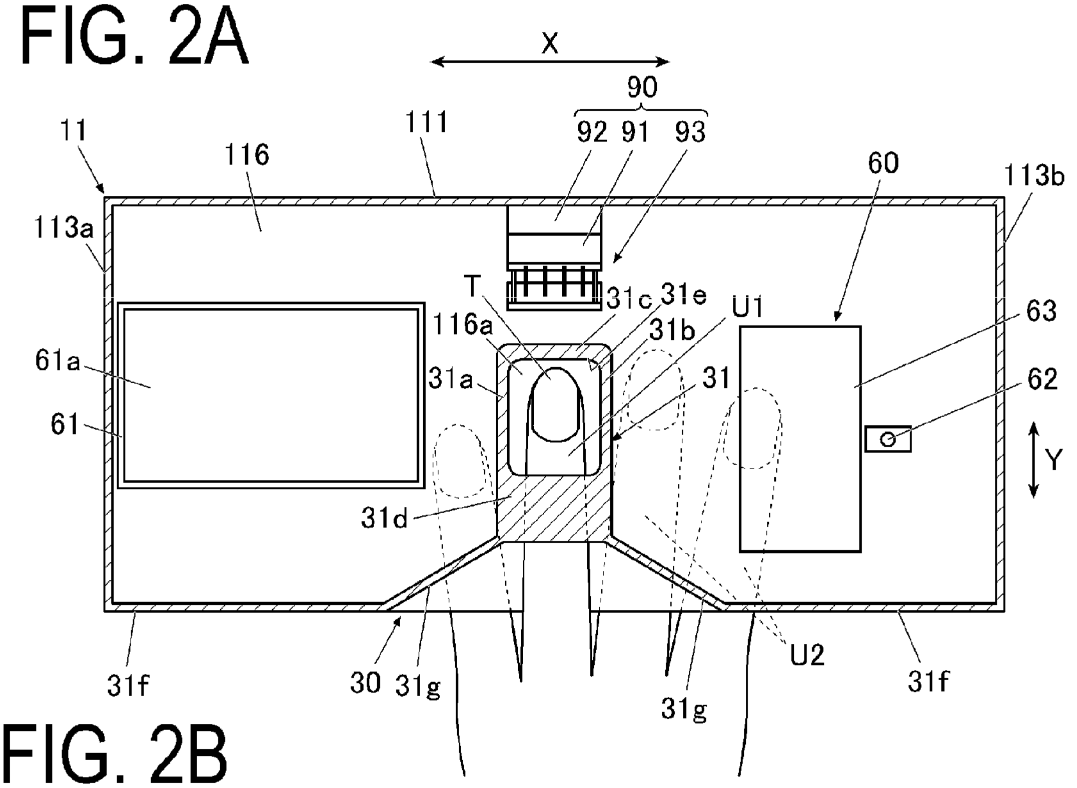
FIG. 2A is a cross-sectional view taken along II-II of FIG. 1A.

FIG. 1A is a front view of a nail printing apparatus, illustrating an internal configuration of the nail printing apparatus. FIG. 1B is a side view illustrating the internal configuration of the nail printing apparatus illustrated in FIG. 1A. FIG. 2A is a cross-sectional view taken along line II-II of FIG. 1A.

As illustrated in FIGS. 1A and 1B, in the nail printing apparatus 1 of the present embodiment, a drawing head 43 is provided with drawing tools, namely a pen 41, and an ink jet drawing portion 71. The nail printing apparatus 1 of the present embodiment uses plotter printing and ink jet printing to perform a drawing on a nail T of a print finger U1.

The nail printing apparatus 1 is provided with a case body 2 and an apparatus main body 10 housed in the case body 2.

A cover 23, configured to be openable and closeable, for replacing the pen 41 and the ink jet drawing portion 71 of the hereinafter described drawing unit 40 is provided in an end of an upper portion of a side surface of the case body 2. The cover 23 is rotatable via, for example, a hinge or the like, from a closed state to an open state, as illustrated in FIG. 1A.

An operation unit 25 (see FIG. 4) is set on an upper surface (top panel) of the case body 2.

The operation unit 25 is an input unit where a user performs various types of input.

Operation buttons (not illustrated) for performing various types of input are set in the operation unit 25. Examples of the operation buttons include a power switch button for turning on the power of the nail printing apparatus 1, a stop switch button for stopping operation, a design selection button for selecting a design image to be drawn on the nail T, a drawing start button for commanding the drawing to start, and the like.

A display unit 26 is set approximately in a center portion of the top surface (top panel) of the case body 2.

The display unit 26 is configured from, for example, a liquid crystal display (LCD), an organic electroluminescence display, or other type of flat display.

In the present embodiment, examples of images appropriately displayed on the display unit 26 include nail images obtained by imaging the print finger U1 (finger images including images of the nail T), images of the outline or the like of the nail T included in the nail images, design selection images for selecting a design image to be drawn on the nail T, thumbnail images for design confirmation, command screens displaying various commands, and the like.

Note that a configuration is possible in which a touch panel for performing various types of input is integrated into the surface of the display unit 26.

The apparatus main body 10 is formed into a rough box-shape and is provided with a lower frame 11 set in the lower portion of the interior of the case body 2, and an upper frame 12 set above the lower frame 11 and in the upper portion of the interior of the case body 2.

First, the lower frame 11 will be described.

The lower frame 11 has a back surface plate 111, a bottom plate 112, a pair of left and right side plates 113*a* and 113*b*, an X-direction movement stage housing 114, a Y-direction movement stage housing 115, and a dividing wall 116.

Bottom edges of the side plates 113*a* and 113*b* are joined respectively to left and right edges of the bottom plate 112. The side plates 113*a* and 113*b* are provided in an upright state on the bottom plate 112.

A lower portion of the back surface plate 111 is formed so as to sink forward (toward the finger insertion direction proximal side) in two stages. The bottom edge of the back surface plate 111 is joined to a front edge of the bottom plate 112, and the back surface plate 111 divides the area surrounded by the bottom plate 112 and the side plates 113*a* and 113*b* into front and back.

The space formed on the back side of the sunken back surface plate 111 becomes the X-direction movement stage housing 114 and the Y-direction movement stage housing 115 (see FIG. 1B). An X-direction movement stage 45 of the drawing unit 40 is housed in the X-direction movement stage housing 114 when the drawing unit 40 is moved forward (toward the finger insertion direction proximal side). A Y-direction movement stage 47 of the drawing unit 40 is disposed in the Y-direction movement stage housing 115.

The dividing wall 116 is provided inside the lower frame 11 so as to vertically divide the space on the front side inside the lower frame 11 (the space on the finger insertion direction proximal side surrounded by the back surface plate 111, the bottom plate 112, and the side plates 113*a* and 113*b*). The dividing wall 116 is provided roughly horizontally, left and right edges of the dividing wall 116 are joined respectively to the side plates 113*a* and 113*b*, and a back edge of the dividing wall 116 is joined to the back surface plate 111.

A finger securing portion 30 (see FIG. 1B) is provided integrally in the lower frame 11.

The finger securing portion 30 is configured from a finger receiving portion 31 for receiving the finger corresponding on the nail T to which drawing will be performed (hereinafter referred to as "print finger U1"), and a finger clearing portion 32 for clearing fingers other than the print finger U1 (hereinafter referred to as "non-print fingers U2").

The finger receiving portion 31 is disposed on an upper side of the dividing wall 116 and roughly in a center portion in a width direction of the lower frame 11. The space on the lower side of the lower frame 11, partitioned by the dividing wall 116, forms the finger clearing portion 32.

For example, in cases where performing a drawing on the nail T of a ring finger, the ring finger is inserted into the finger receiving portion 31 as the print finger U1, and the non-print fingers U2, namely the other four fingers (thumb, index finger, middle finger, and little finger) are inserted into the finger clearing portion 32.

As illustrated in FIGS. 1B and 2A, the finger receiving portion 31 is open to a front surface side of the lower frame 11 (print finger insertion direction proximal side); and a bottom side is defined by a finger mount portion 116*a* that constitutes a portion of the dividing wall 116, sides are defined by partitions 31*a* and 31*b*, and a rear side is defined by a partition 31*c*. The finger mount portion 116*a* is a constituent where the finger (the print finger U1) of the nail T on which drawing is to be performed is mounted on the X-Y plane.

A top side of the finger receiving portion 31 is defined by a ceiling portion 31*d*. A window 31*e* is formed in the ceiling portion 31*d* for exposing the nail T of the print finger U1 inserted into the finger receiving portion 31.

A front wall 31*f* (see FIG. 1A) that closes the front surface side of the lower frame 11 is provided on the top surface of the dividing wall 116, at both end portions on the front surface side of the lower frame 11. A pair of guide walls 31*g* (see FIG. 1A) that guides the print finger U1 into the finger receiving portion 31 is erected on the top surface of the dividing wall 116, and the pair of guide walls 31*g* narrows from the end of the front wall 31*f* on the center portion side toward the finger receiving portion 31.

A user can pinch the dividing wall 116 between the print finger U1 inserted into the finger receiving portion 31 and the non-print fingers U2 inserted into the finger clearing portion 32. Thus, the print finger U1 inserted into the finger receiving portion 31 is stably secured.

As illustrated in FIG. 2A, a drying unit (dryer) 90 is provided in a rear side upper portion, separated from the finger receiving portion 31 by the partition 31*c*.

The drying unit 90 includes a fan 92 for blowing, and performs a drying operation for drying ink (liquid material) that has been applied to the drawing object, namely, the nail T. In addition to the fan 92, the drying unit 90 of the present embodiment further includes a heater 91 for generating heat.

The fan 92 is disposed on the apparatus back side, and the heater 91 is disposed more to the front side than the fan 92, that is, downstream in a blowing direction of the fan 92.

The heater 91 is, for example, a ceramic heater, generates heat when a power source of the heater 91 is in an ON state, and heats the ambient air. Note that, provided that the heater 91 is small enough to be incorporated into the nail printing apparatus 1, the heater 91 may be an electric heater in which heating wire such as nichrome wire or the like is coiled, but the configuration thereof is not limited to the examples given herein.

The drying unit 90 has functions that direct the wind generated by the fan 92 via the window 31*e* to the nail T of the print finger U1 placed in the finger receiving portion 31, and dry an ink jet drawing (that is, a drawing performed by an ink jet drawing unit 71 described hereinafter) or a plotter drawing (that is, a drawing performed by a pen 41 described hereinafter) performed on the nail T.

The drying unit 90 of the present embodiment further includes a wind direction adjusting unit 93 that is provided with power cylinders 97 and that adjusts a direction of wind generated by the fan 92.

Note that operations of the heater 91 and the fan 92 of the drying unit 90, and the power cylinders 97 of the wind direction adjusting unit 93 are controlled by a drying control portion 814 described hereinafter (see FIG. 4).

Figure 2B:
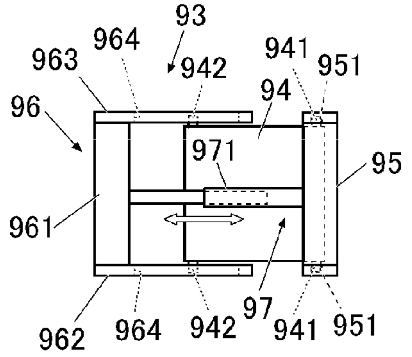
FIG. 2B is a side view of a wind direction adjusting unit.
Figure 2D:
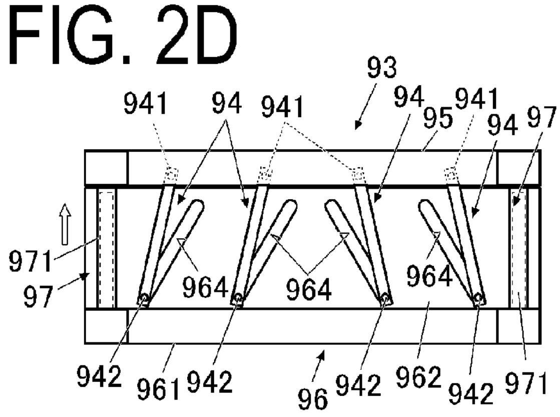
FIG. 2D is a top view illustrating the wind direction adjusting unit in a case where an aperture is largest.
Figure 2C:
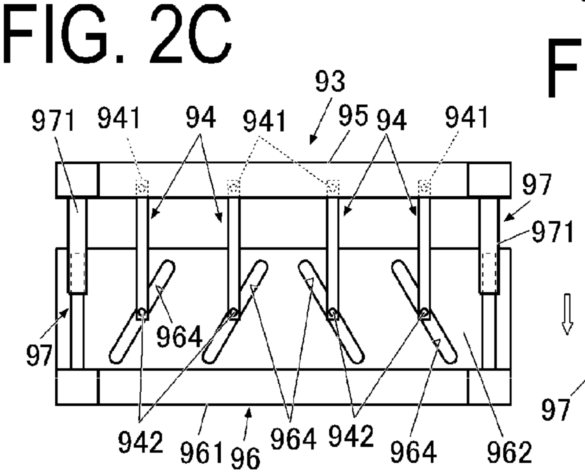
FIG. 2C is a top view illustrating an initial state of the wind direction adjusting unit.
Figure 2E:
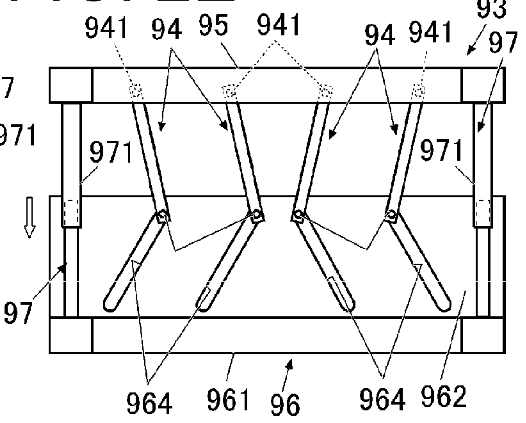
FIG. 2E is a top view illustrating the wind direction adjusting unit in a case where the aperture is smallest.

FIG. 2B is a side view of the wind direction adjusting unit 93, and FIGS. 2C to 2E are top views of the wind direction adjusting unit 93. Note that FIGS. 2C to 2E depict a state where a top panel 963 (described hereinafter) is removed in order to show an internal configuration of the wind direction adjusting unit 93.

As illustrated in FIGS. 2B to 2E, the wind direction adjusting unit 93 includes a plurality of blades 94 that change the direction of the wind by changing a widening angle with respect to the nail T disposed in the finger receiving portion 31; a back surface member 95 to which first ends (in the present embodiment, ends of the blades 94 on the apparatus back side) of the blades 94 are rotatably attached; and a front surface member 96 to which second ends (in the present embodiment, ends of the blades 94 on the apparatus front side) of the blades 94 are engaged.

The blades 94 are plate-like members formed from resin or the like, and form flow paths for the wind generated by the fan 92. Note that in the present embodiment, an example is given in which four of the blades 94 are provided in the wind direction adjusting unit 93, but the number and the like of the blades 94 is not limited to the depicted example.

Engaging protrusions 941 are formed on the top and bottom (the top and bottom in FIG. 2B) of the end of the blades 94 on the apparatus back side.

Engaging protrusions 942 are also formed on the top and bottom (the top and bottom in FIG. 2B) of the end of the blades 94 on the apparatus front side.

The back surface member 95 is a frame-like member to which the end of the heater 91 on the apparatus front side is fixed.

Engagement holes 951 into which each of the engaging protrusions 941 fit are formed in the back surface member 95 at positions corresponding to each of the engaging protrusions 941 of the blades 94. The ends of the blades 94 on the apparatus back side engage with the back surface member 95 when the engaging protrusions 941 of the blades 94 are fit into the engagement holes 951.

The front surface member 96 is disposed in the wind direction adjusting unit 93 on apparatus front side, and includes a frame-like member 961 which, together with the blades 94, forms an aperture (air outlet) of the drying unit 90; a bottom plate 962 disposed on a bottom surface side of the frame-like member 961; and a top plate 963 disposed on a top surface side of the frame-like member 961.

Four engagement holes 964 in which the engaging protrusions 942 of the blades 94 engage are formed corresponding to the engaging protrusions 942 of the blades 94, at corresponding positions in each of the bottom plate 962 and the top plate 963.

In the present embodiment, of the four engagement holes 964, the two positioned on the right side of the apparatus (the right side in FIG. 2A and FIGS. 2C to 2E) are long holes formed so as to open to the right side from the apparatus back side toward the apparatus front side; and the two positioned on the left side of the apparatus (the left side in FIG. 2A, and FIGS. 2C to 2E) are long holes formed so as to open to the left side from the apparatus back side toward the apparatus front side.

As such, the four engagement holes 964 are formed such that two on each of the left and the right are inclined in the same direction, and such that overall, the engagement holes 964 form a V-shape that widens in a width direction (a left-right direction in FIG. 2A and FIGS. 2C to 2E) of the apparatus from the apparatus back side toward the apparatus front side.

Note that a length and/or an angle of widening or the like of the long holes, namely the engagement holes 964, is determined in accordance with the size of the blades 94 and/or the extent to which the range of the direction (angle) of the blades 94 is to be adjusted. That is, longer lengths of the engagement holes 964 and larger angles of left-right widening make it possible to greatly change in the direction (angle) of the blades 94.

The engaging protrusions 942 of each of the blades 94 engage with these engagement holes 964 formed in the bottom plate 962 and the top plate 963 of the front surface member 96, and are guided along the engagement holes 964 so that slide movement within the engagement holes 964 is possible.

A pair of power cylinders 97 is provided between the back surface member 95 and the front surface member 96.

First ends of the power cylinders 97 are attached to the back surface member 95 and second ends are attached to the frame-like member 961 of the front surface member 96. The power cylinders 97 can change a length of rods 971 in accordance with the control of the drying control portion 814 (described hereinafter). As a result, distance between the back surface member 95 and the front surface member 96 can be adjusted.

FIG. 2C is a drawing illustrating a case in which the power cylinders 97 are in an initial state.

As illustrated in FIG. 2C, in the initial state of the power cylinders 97, the length of the rods 971 is set to approximately a middle position and, in this state, the engaging protrusions 942 of each of the blades 94 are engaged at approximately a middle position of the engagement holes 964, and each of the blades 94 is disposed such as to be substantially parallel to the insertion direction of the print finger U1 into the finger receiving portion 31. As a result, the width of the aperture of the drying unit 90 is substantially the same as the width of the fan 92, and a flow path of the wind having a width equivalent to the width of the fan 92 is formed.

FIG. 2D is a drawing illustrating a case in which the rods 971 of the power cylinders 97 are contracted and the front surface member 96 is in a state pulled toward the back surface member 95.

As illustrated in FIG. 2D, in a state where the rods 971 of the power cylinders 97 are contracted as short as possible, the engaging protrusions 942 of each of the blades 94 move to the end of the engagement holes 964 on the apparatus front side, and the side of each of the blades 94 facing the finger receiving portion 31 (that is, the apparatus front side) widen in the left-right direction (the left-right direction in FIGS. 2A and 2D) of the apparatus, thus assuming a state where the wind generated by the fan 92 is widely spread. That is, a flow path with a width wider than the width of the fan 92 is formed by the blades 94, and a state is assumed where a cross-sectional area of the aperture of the drying unit 90 is greatest.

FIG. 2E is a drawing illustrating a case in which the rods 971 of the power cylinders 97 are extended and the front surface member 96 is pushed away from the back surface member 95 side toward the apparatus front side.

As illustrated in FIG. 2E, in a state where the rods 971 of the power cylinders 97 are extended as long as possible, the engaging protrusions 942 of each of the blades 94 move to the end of the engagement holes 964 on the apparatus back side, and the apparatus back side of each of the blades 94 widen in the left-right direction of the apparatus (the left-right direction in FIGS. 2A and 2E), thus assuming a state where the blades 94 narrow toward the finger receiving portion 31 and the wind generated by the fan 92 is blown across a narrow range. That is, a flow path with a width narrower than the width of the fan 92 is formed by the blades 94, and a state is assumed where the cross-sectional area of the aperture of the drying unit 90 is smallest.

A warm-up drawing portion 61 is provided on the top surface of the lower frame 11, beside the finger receiving portion 31 (location corresponding to a media access port 24 of the case body 2, on the left side in FIGS. 1A and 2A). The warm-up drawing portion 61 (described hereinafter) is for performing warm-up drawing to eliminate fading and the like at a time of beginning of drawing by a pen tip (tip portion) 413 of the pen 41 within a drawable area of the drawing head 43 (described hereinafter).

The warm-up drawing portion 61 is a flat portion and is configured so that drawing media 61*a* inserted through the media access port 24 of the case body 2 is mounted thereon.

The drawing media 61*a* mounted on the warm-up drawing portion 61 is not limited, provided that warm-up drawing of the pen tip (tip portion) 413 can be performed, and for example, may be a piece of paper.

A home area 60 where the drawing head 43 stands by at times when the drawing head 43 is not drawing is provided on the top surface of the lower frame 11, across the finger receiving portion 31 on the opposite side from the warm-up drawing portion 61 (in the present embodiment, the right side in FIGS. 1A and 2A), within a movable range of the drawing head 43 described hereinafter.

A number of pen caps 62 (in the present embodiment, one) exactly corresponding to a pen holder 42 described hereinafter are set in the home area 60.

The pen cap 62 is formed, for example, from rubber, and at times when the pen 41 is mounted to the drawing unit 40 but not drawing (when not drawing), drying out of the pen tip 413 is prevented by lowering the pen 41 and storing the pen tip 413 in the pen cap 62.

An ink jet maintenance portion 63 is provided within the home area 60, at a position corresponding to a position where the ink jet drawing portion 71 is disposed when the pen tip 413 is stored in the pen cap 62. The ink jet maintenance portion 63 is configured from, for example, a cleaning mechanism for cleaning an ink discharging portion (nozzle surface) of the ink jet drawing portion 71 described hereinafter, a cap mechanism for maintaining moist conditions of the ink discharging portion (nozzle surface), and the like (all not illustrated).

Note that the disposal of the pen cap 62, the ink jet maintenance portion 63, and the like in the home area 60 is not limited to the examples described herein.

The drawing unit 40 is configured from and provided with the drawing head 43, a unit supporting member 44 that supports the drawing head 43, the X-direction movement stage 45 for moving the drawing head 43 in the X direction (the X direction in FIGS. 1A and 2A; the left-right direction of the drawing apparatus 1), an X-direction movement motor 46, the Y-direction movement stage 47 for moving the drawing head 43 in the Y direction (the Y direction in FIGS. 1B and 2A; the front-back direction of the drawing apparatus 1), a Y-direction movement motor 48, and the like.

Figure 3A:
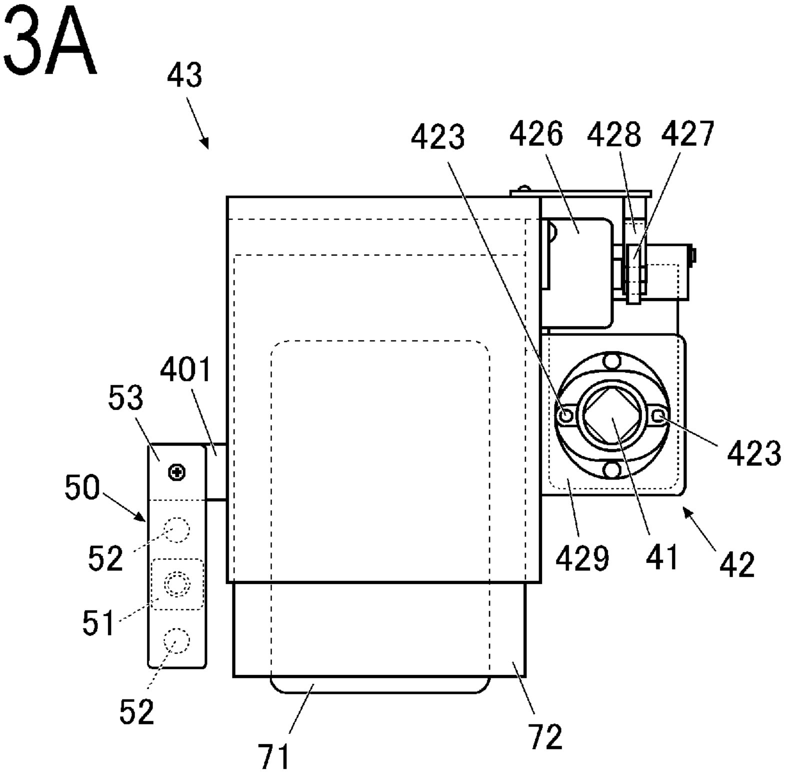
FIG. 3A is a top view of a drawing head according to the embodiment of the present invention.
Figure 3B:
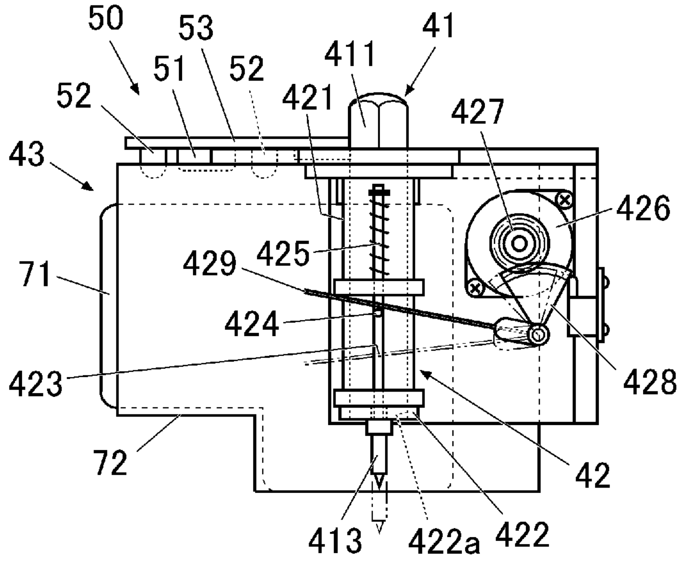
FIG. 3B is a side view of the drawing head according to the embodiment of the present invention.

FIG. 3A is a top view of a drawing head and FIG. 3B is a side view of the drawing head according to the present embodiment.

As illustrated in FIGS. 3A and 3B, in the drawing head 43 of the present embodiment, the pen holder 42 holding the pen 41 and an ink jet holder 72 holding the ink jet drawing portion 71 are disposed adjacently to each other.

The ink jet drawing portion 71 is, for example, an ink cartridge-integrated head in which ink cartridges (not illustrated) corresponding to yellow (Y), magenta (M), and cyan (C) ink are formed integrally with an ink discharging portion (not illustrated) provided on a surface (in the present embodiment, the bottom surface in FIG. 1A and the like) facing the drawing object (the nail T) in each of the ink cartridges. The ink discharging portion is provided with a nozzle array consisting of a plurality of nozzles arranged in a row, for spraying each color of ink. The ink jet drawing portion 71 micronizes the ink and performs the drawing by spraying the ink from the ink discharging portion directly on the target drawing surface of the drawing object (the nail T). Note that the ink jet drawing portion 71 is not limited to those that discharge the three colors of ink described previously. Ink cartridges holding other ink and ink discharging portions may also be provided.

One pen 41 is mountable in the pen holder 42 of the present embodiment.

The pen 41 is a writing utensil that has the surface of the nail T as its drawing object, and performs a drawing by the tip portion thereof being brought into contact with the drawing object, namely the surface of the nail T.

As illustrated in FIG. 3B and the like, the pen 41 is provided with the pen tip 413 on a tip side (the lower side in FIG. 3B) of a rod-like pen shaft portion 411.

An interior of the pen shaft portion 411 is an ink storing portion for storing various types of ink.

Any type of ink can be stored in the interior of the pen shaft portion 411. Viscosity of ink, diameter of the coloring particles (particle size), and the like are not particularly limited and, for example, ink having metallic glitter, white ink, ink for under coats, ink for top coats, nail varnish, and the like can be used.

In the present embodiment, the pen 41 is a ballpoint pen in which the pen tip 413 draws by the ink stored in the pen shaft portion 411 being dispensed by pressing the pen tip 413 against the surface of the nail T.

Note that the pen 41 is not limited to a ballpoint pen. For example, the pen 41 may be a felt-tip pen that draws by soaking ink into a felt-like pen tip, a brush pen that draws by soaking ink into a bundle of hairs, or the like.

The pen 41 having the pen tip 413 of any desired thickness may be provided as well.

The pens 41 that are held in the pen holder 42 may be pens that all have the same type of the pen tip 413, or may be pens that have different types of the pen tip 413.

The pen 41 is held by simply inserting it in the pen holder 42 from above. As such, the pen 41 can be easily replaced by opening the cover 23 provided in the case body 2 and, for example, using hands or tweezers to grab a top end portion of the pen shaft portion 411 and lift the pen 41 out.

Thus, a user can realize a wide range of nail designs by appropriately replacing the pen 41 set in the pen holder 42 for a pen 41 having a different color or a different pen tip 413, or using a different type of ink, depending on the nail design desired to be drawn.

The pen holder 42 is provided with a tubular member 421 that is open vertically and into which the pen 41 is inserted, a pen retaining member 422 disposed so as to block an opening on a bottom side of the tubular member 421 (the bottom side in FIG. 3B), and an auxiliary rod member 423 that moves vertically with the pen 41.

A retaining hole 422*a* that retains the tip side of the pen shaft portion 411 of the pen 41 is formed in the pen retaining member 422. The pen 41 is retained in the pen holder 42 by the tip side of the pen shaft portion 411 being inserted in the retaining hole 422*a* of the pen retaining member 422. Note that screw grooves (not illustrated) may be formed in an outer circumferential surface of the tip side of the pen shaft portion 411, screw grooves (not illustrated) capable of mating with the screw grooves of the shaft portion may be formed in an inner circumferential surface of the retaining hole 422*a*, and the pen 41 may be retained in the retaining hole 422*a* by screwing the screw grooves on the pen shaft portion 411 side into the screw grooves on the retaining hole 422*a* side.

In the present embodiment, two of the auxiliary rod members 423 are disposed so as to sandwich the pen 41. A bottom end of each of the auxiliary rod members 423 is mated with the pen retaining member 422 and, thereby, the auxiliary rod members 423 are fixed so as to be parallel with the pen shaft portion 411 of the pen 41.

A retaining protrusion 424 protruding in a direction away from the axial center of the pen 41 is provided on the auxiliary rod members 423.

A coil spring 425 is wrapped around the rod of the auxiliary rod members 423. The coil spring 425 is configured to apply force in an upward direction to the auxiliary rod member 423 in a state free of outside forces and holds the position of the pen 41 when not drawing at a position where the pen tip 413 does not come into contact with the nail T.

A pen vertical motor 426 constituted by a stepping motor, a gear 428 that engages with a gear 427 attached to a rotating shaft of the pen vertical motor 426, and a plate spring 429 that pivots along with the rotation of the gear 428 are provided in the vicinity of the pen holder 42. In the present embodiment, a lifting mechanism of the pen 41 is constituted by the pen vertical motor 426, the gear 427, the gear 428, the plate spring 429, and the like.

Here, the plate spring 429 engages with the retaining protrusion 424 provided on the auxiliary rod member 423 and presses the retaining protrusion 424 down, thereby pressing the pen 41 downward.

That is, when the plate spring 429 pivots along with the rotation of the pen vertical motor 426 and the plate spring 429 engages with the retaining protrusion 424 and presses the retaining protrusion 424 downward, the pen 41 is pressed downward against the biasing force of the coil spring 425.

The present embodiment has a configuration in which the pen 41 is not pressed down directly by the plate spring 429; instead, the plate spring 429 presses down on the retaining protrusion 424 and the plate spring 429 is not disposed over the pen 41. Therefore, the pen 41 can easily be replaced, the height of the lifting mechanism of the pen 41 can be kept relatively low, and space can be saved.

Next, a detailed description of the lifting mechanism of the pen 41 is given.

First, when not drawing, the plate spring 429 is in a state where not applying outside pressure to the retaining protrusion 424. In the state where outside pressure (pressing force by the plate spring 429) is not applied, the pen 41 is pressed up in an upward direction (the upward direction in FIGS. 1A and 3B) by the biasing force of the coil spring 425, and the tip side of the pen 41, that is, the pen tip 413, is separated from the drawing object, namely the surface of the nail T, and held at a height where not coming into contact with the surface.

On the other hand, when drawing, the pen vertical motor 426 rotates a prescribed number of steps and the plate spring 429 presses the retaining protrusion 424 down. Thereby, the pen 41 is pressed downward.

The prescribed number of steps when driving the pen vertical motor 426 is appropriately set depending on a height and the like of the nail T of the print finger U1 inserted into the finger receiving portion 31.

That is, in the nail printing apparatus 1 of the present embodiment, nail information (described hereinafter) is acquired in advance. Moreover, the height of the nail T at a contact position where the tip side of the pen 41, namely the pen tip 413, comes into contact with the nail T is confirmed on the basis of the nail information, and the number of steps of the pen vertical motor 426 is determined on the basis of the height. The pen vertical motor 426 is driven the determined number of steps and the plate spring 429 presses the pen 41 down. Thus, the tip side of the pen 41, namely the pen tip 413 is moved toward to contact the surface of the nail T and an appropriate amount of pen pressure is applied.

Note that when drawing, the height of the location on the nail T where the drawing is being performed changes with changes in the drawing position. Each time a change occurs, the number of steps of the pen vertical motor 426 is increased or decreased, so that the pen pressure of the pen 41 is adjusted. Thus, drawing is performed while making adjustments to ensure that the pen pressure is roughly constant. Here, the adjustment to the pen pressure by increasing or decreasing the number of steps of the pen vertical motor 426 is performed each time a change occurs, when the change in the height of the nail T changes a predetermined amount (e.g. 0.5 mm). When the change in the height of the nail T is less than the predetermined amount, no adjustment is made to the pen pressure, but the pen 41 automatically moves vertically due to the flexural deformation (elastic deformation) of the plate spring 429 in accordance with the shape of the nail T and, therefore, the pen 41 can be reliably brought into contact with the nail T and, at the same time, the pen pressure can be maintained at an appropriate value.

Note that a spring constant of the plate spring 429 is not that great and is set to a value of a magnitude where pain is not felt by the nail T when the pressing force (outside force) of the plate spring 429 is applied to the nail T. When drawing, impact due to the vertical movement of the pen 41 is absorbed by the plate spring 429 flexing a suitable degree and the pen 41 moves vertically along with the height of the nail T while maintaining a suitable degree of pen pressure of the pen tip 413 in a roughly constant manner. Thus, the desired nail design can be drawn neatly on the surface of the drawing object, namely the nail T.

The unit supporting member 44 is fixed to the X-direction movement portion 451 that is attached to the X-direction movement stage 45. The X-direction movement portion 451 is configured to move on the X-direction movement stage 45 in the X direction along a guide (not illustrated) via the driving of the X-direction movement motor 46. Thus, the drawing head 43 that is attached to the unit supporting member 44 is configured to move in the X direction (the X direction in FIG. 1A and the left-right direction of the nail printing apparatus 1).

The X-direction movement stage 45 is fixed to a Y-direction movement portion 471 of the Y-direction movement stage 47. The Y-direction movement portion 471 is configured to move on the Y-direction movement stage 47 in the Y direction along a guide (not illustrated) via the driving of the Y-direction movement motor 48. Thus, the drawing head 43 that is attached to the unit supporting member 44 is configured to move in the Y direction (the Y direction in FIG. 1B and the front-back direction of the nail printing apparatus 1).

Note that in the present embodiment, the X-direction movement stage 45 and the Y-direction movement stage 47 are configured from combinations of the X-direction movement motor 46, the Y-direction movement motor 48, and ball screws and guides (not illustrated).

In the present embodiment, a head movement portion 49 is configured as an XY drive unit that drives the drawing head 43 provided with the pen 41 in the X direction and the Y direction via the X-direction movement motor 46, the Y-direction movement motor 48, and the like.

The pen vertical motor 426, the ink jet drawing portion 71, the X-direction movement motor 46, and the Y-direction movement motor 48 of the drawing unit 40 are connected to a drawing control portion 817 of a control device 80 (see FIG. 4; described hereinafter), and are configured to be controlled by the drawing control portion 817.

The imaging unit 50 is provided with an image capturing device 51 and an illumination device 52.

The imaging unit 50 illuminates the nail T of the print finger U1, which is inserted into the finger receiving portion 31 and is visible through the window 31*e*, using the illumination device 52. Moreover, the print finger U1 is imaged using the image capturing device 51 and a nail image, namely an image of the nail T of the print finger U1 (image of finger including nail image), is obtained.

In the present embodiment, the image capturing device 51 and the illumination device 52 are fixed on a side (the left side of the drawing head 43 in FIG. 1A) of the drawing head 43 of the drawing unit 40.

Specifically, as illustrated in FIG. 3A, the drawing head 43 of the drawing unit 40 has an overhanging portion 401 overhanging in a lateral direction from a first edge (the left side in FIG. 3A) of the top surface of the drawing head 43, and a substrate 53 is attached to the overhanging portion 401. The image capturing device 51 and the illumination device 52 constituting the imaging unit 50 are provided on a bottom surface of the substrate 53 so as to face the dividing wall 116.

Note that a size of the substrate 53 and positions where the image capturing device 51 and the illumination device 52 are attached to the substrate 53 are not particularly limited.

The image capturing device 51 is, for example, a small camera having a solid state image sensor with a pixel count of about 2 million pixels or greater, a lens, and the like.

The image capturing device 51 is configured to detect curvature and the like of the nail T of the print finger U1 by movement of the head movement portion 49 so as to image the nail T from at least two different positions or angles. As a result, at least two of the nail images are acquired and a nail information detection portion 812 (described hereinafter) detects the nail information such as an outline of the nail T (shape of the nail T), curved shape of the nail T (curvature of the nail T), vertical position of the nail T, and the like on the basis of the nail images.

Note that in the present embodiment, due to the fact that the image capturing device 51 can be moved to above the nail T of the print finger U1, which is inserted in the finger receiving portion 31, by the head movement portion 49 and imaging can be performed, it is sufficient that an imagable area of the image capturing device 51 covers the area of one nail T.

The illumination device 52 is, for example, a white LED or similar illuminating lamp.

In the present embodiment, two of the illumination devices 52 are disposed on a front side and a back side of the image capturing device 51 so as to sandwich the image capturing device 51. The illumination device 52 radiates light downward and illuminates an imaging area below the image capturing device 51.

Note that the disposal and number of the illumination devices 52 provided is not limited to the illustrated examples.

The imaging unit 50 is connected to an imaging control portion 811 of the control device 80 (described hereinafter, see FIG. 4), and is configured to be controlled by the imaging control portion 811.

Note that image data of the image imaged by the imaging unit 50 is stored in a nail image memory region 821 of a memory unit 82 (described hereinafter).

The control device 80 is, for example, arranged on a substrate 13 or the like disposed in the upper frame 12.

Figure 4:
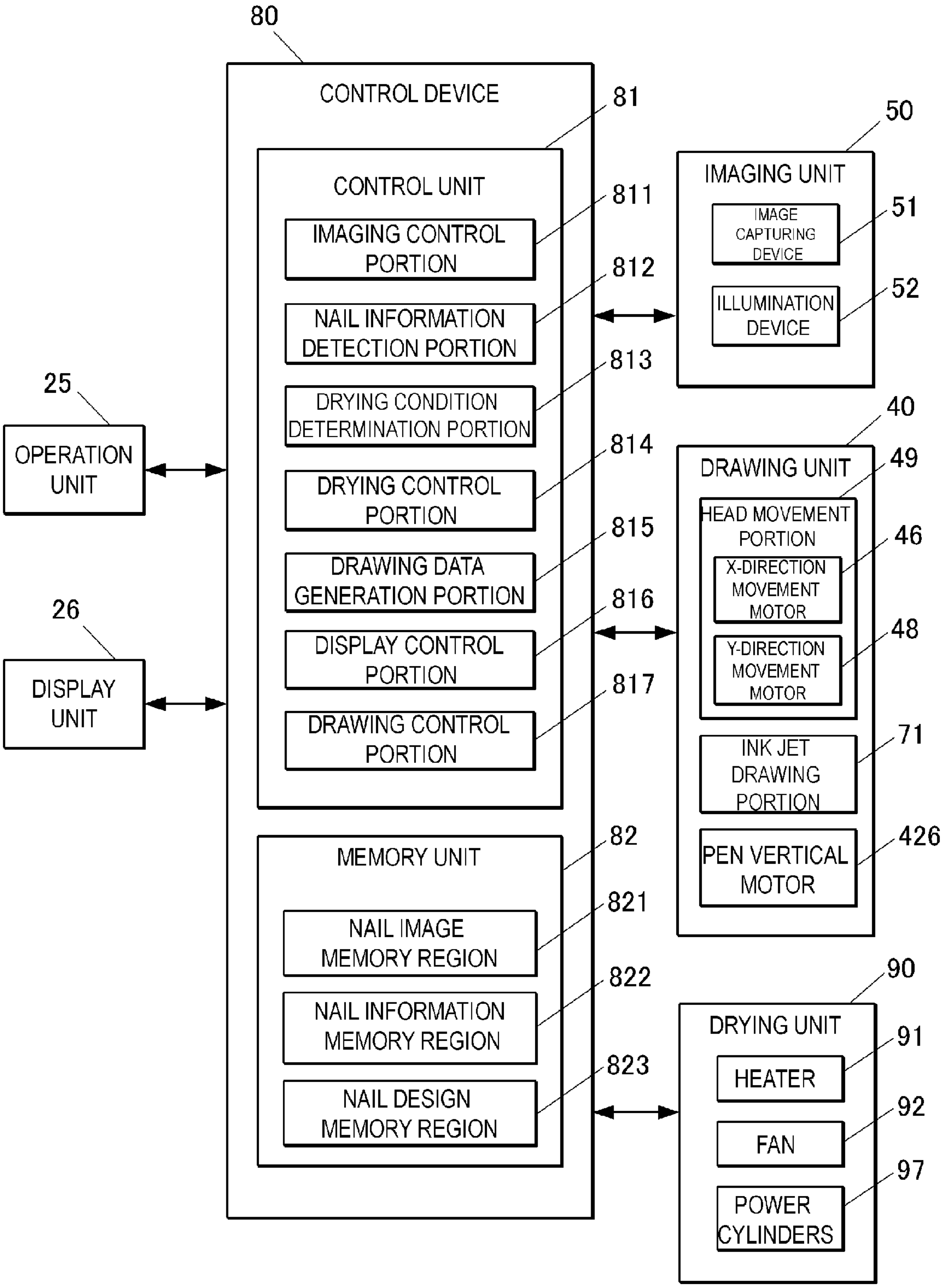
FIG. 4 is a main constituent block diagram showing a control configuration of the drawing apparatus according to the embodiment of the present invention.

FIG. 4 is a main constituent block diagram showing the control configuration according to the present embodiment.

As illustrated in FIG. 4, the control device 80 is a computer provided with a control unit (processor) 81 constituted by a central processing unit (CPU) (not illustrated), and the memory unit 82 constituted by a read only memory (ROM), a random access memory (RAM), or the like (neither illustrated).

Various programs to operate the nail printing apparatus 1, various data, and the like are stored in the memory unit 82.

Specifically, various programs are stored in the ROM of the memory unit 82 such as a nail information detection program for detecting various types of nail information such as the shape, the outline, the nail width, and the nail area of the nail T from the nail image; a drying condition determination program for determining the drying condition of the ink; a drawing data generation program for generating drawing data; and a drawing program for performing drawing processing. These programs are executed by the control device 80 and, thus, the components of the nail printing apparatus 1 are controlled in an integrated manner.

In the present embodiment, the memory unit 82 is provided with the nail image memory region 821 where the nail image of the nail T of the print finger U1 of a user acquired by the imaging unit 50 is stored, a nail information memory region 822 where the nail information detected by the nail information detection portion 812 (the outline of the nail T, inclination angle of the nail T, and the like) is stored, a nail design memory region 823 where image data of a nail design to be drawn on the nail T is stored, and the like.

When viewed from a function perspective, the control unit 81 is provided with the imaging control portion 811, the nail information detection portion 812, a drying condition determination portion 813, the drying control portion 814, a drawing data generation portion 815, a display control portion 816, a drawing control portion 817, and the like. Functions of the imaging control portion 811, the nail information detection portion 812, the drying condition determination portion 813, the drying control portion 814, the drawing data generation portion 815, the display control portion 816, the drawing control portion 817, and the like are realized by cooperation of the CPU of the control unit 81 and the programs stored in the ROM of the memory unit 82.

The imaging control portion 811 is configured to cause the image capturing device 51 to capture images of fingers (hereinafter referred to as "nail images"), including images of the nail T of the print finger U1 inserted into the finger receiving portion 31, by controlling the image capturing device 51 and the illumination device 52 of the imaging unit 50.

In the present embodiment, the image capturing device 51 is moved by the drawing control portion 817 that controls the head movement portion 49, and the imaging control portion 811 causes at least two of the nail images from two different positions or angles (e.g. directly above the nail T and diagonally above the nail T, or the like), to be acquired.

The image data of the nail image acquired by the imaging unit 50 are stored in the nail image memory region 821 of the memory unit 82.

The nail information detection portion 812 is configured to detect the nail information of the nail T of the print finger U1 on the basis of the image of the nail T of the print finger U1 inserted into the finger receiving portion 31, the image being imaged by the image capturing device 51.

Here, "nail information" refers to, for example, the outline of the nail T (nail shape, XY coordinates of the horizontal position of the nail T, and the like), the height of the nail T (position in the vertical direction of the nail T, hereinafter referred to as the "vertical position of the nail T" or simply the "position of the nail T"), and the inclination angle with respect to the XY plane of the surface of the nail T (the inclination angle of the nail T or nail curvature). Additionally, a length in a width direction (lateral direction) W of the nail T and a length in an extending direction (longitudinal direction) L of the nail T are acquired from the XY coordinates and the like of the horizontal position of the nail T.

The nail information detection portion 812 can accurately detect the curvature and the like of the nail T by performing the detection of the nail information using a plurality of nail images imaged from different positions or angles (e.g. directly above the nail T, diagonally above the nail T, and the like).

The drying condition determination portion 813 determines the drying condition for the drying unit 90.

Here, the "drying condition" is a condition that must be considered when performing drying operations using the drying unit 90 for drying the ink (that is, the liquid material) that has been applied to the drawing object, namely the surface of the nail T. In the present embodiment, the drying condition refers to the size of the area of the surface of the nail T (drawing object) to which the ink has been applied.

In the present embodiment, the drying condition determination portion 813 acquires a cumulative total of the drawing distance traveled by the drawing unit 40 when actually performing drawing on the nail T, and acquires the area of the surface of the nail T (the drawing object) to which the ink has been applied, on the basis of this cumulative total of drawing distance. Specifically, in the present embodiment, when drawing using the pen 41, the drawing control portion lowers the pen 41 to the surface of the nail T to a position where the pen tip 413 comes into contact with the surface of the nail T at a drawing start position; performs one row of drawing in the length direction of the nail T; then temporarily lifts the pen 41 to a position where the pen tip 413 is not in contact with the surface of the nail T and moves the pen 41 in the width direction of the nail T; and then again lowers the pen 41 and performs one row of drawing in the length direction of the nail T. The drawing is performed by repeating these processes.

When drawing is performed with the pen 41, the drying condition determination portion 813 acquires a cumulative total of the drawing distance of drawing actually performed by the lowered pen 41 on the nail T (that is, a total number of steps that the lowered pen 41 has moved, or the like). When drawing is performed with the ink jet drawing portion 71, the drying condition determination portion 813 acquires a cumulative total of the distance that the ink jet drawing portion 71 has moved while discharging ink, for example.

Moreover, a threshold for classifying the drawing distances into three levels of "standard", "long", and "short" is stored in advance in the memory unit 82 or the like. On the basis of this threshold, the drying condition determination portion 813 determines that the area of the surface of the nail T (drawing object) to which the ink has been applied is "standard" when the drawing distance is "standard", that the area is "large" when the drawing distance is "long", and that the area is "small" when the drawing distance is "short".

Note that the technique whereby the drying condition determination portion 813 determines the size of the area of the surface of the nail T (drawing object) to which the ink has been applied is not particularly limited.

For example, when calibration processing is performed to calibrate a nail design to be drawn on the nail T to a drawing object, namely the nail T of a user, the area of the drawing object may be defined as the area of a region set as the portion where the ink is to be applied.

Alternatively, the size of the area of the drawing object may be determined from the outline of the nail T detected by the nail information detection portion 812. In this case, a threshold for classifying the area into three levels of "standard", "large", and "small" is stored in advance in the memory unit 82 or the like. On the basis of this threshold, the drying condition determination portion 813 determines to which the area of the surface of the nail T of the user detected by the nail information detection portion 812 can be classified.

Furthermore, for example, on the basis of the width of the nail T (length in the lateral direction of the nail T in FIG. 2A), the drying condition determination portion 813 may determine that the area of the drawing object is large if the width of the nail T is wide and that the area of the drawing object is small if the width of the nail T is narrow. In this case, a threshold for classifying the width of the nail T into three levels of "standard", "wide", and "narrow" is stored in advance in the memory unit 82 or the like. On the basis of this threshold, the drying condition determination portion 813 determines to which the width of the nail T of the user that is inserted into the finger receiving portion 31 can be classified.

Note that it is not necessary to classify the area of the surface of the nail T (drawing object) to which the ink has been applied into three levels. Two classifications of "large" and "small", or four or more levels may be used. Additionally, a configuration is possible in which classification is not done by level and, instead, only a value representing the area of the surface of the nail T (drawing object) to which the ink has been applied is acquired in a stepless manner. In this case, the drying control portion 814 (described hereinafter) adjusts the angle of the blades 94 of the wind direction adjusting unit 93 in a stepless manner in accordance with the value acquired by the drying condition determination portion 813.

While the entire surface of the drawing object, namely the nail T, may be used by the drying condition determination portion 813 as the object for determining the size of the area, in order to perform the drying more efficiently, the region where ink has actually been applied in the drawing immediately prior to the drying is preferably used as the object for determining the size of the area. Note that the region of the nail T where the ink is to be applied is identified by the drawing data. As such, in cases where the size of the area of the region where the ink is to be applied is set as the drying condition, a drying condition based on the drawing data can be determined at a point of time of drawing data creation before actually applying the ink.

The drying condition determined by the drying condition determination portion 813 (that is, in the present embodiment, the size of the area of the surface of the nail T (the drawing object) to which the ink has been applied) is sent to the drying control portion 814.

The drying control portion 814 controls the drying operations by controlling the operations of the heater 91, the fan 92, and the power cylinders 97 of the drying unit 90. That is, the drying control portion 814 performs ON/OFF control of the heater 91 and the fan 92, temperature control of the heater 91, adjustment of the wind direction by causing the power cylinders 97 to operate, and the like.

In the present embodiment, the drying control portion 814 is configured to control the drying operations of the drying unit 90 in accordance with the determination by the drying condition determination portion 813.

Next, a detailed description of the control of the wind direction adjusting unit 93 (the power cylinders 97 of the wind direction adjusting unit 93) by the drying control portion 814 is given.

In the present embodiment, when the drying condition determination portion 813 determines that the area of the surface of the nail T (drawing object) to which the ink has been applied is "standard", as illustrated in FIG. 2C, the drying control portion 814 is configured to set the power cylinders 97 to the initial position and adjust all of the blades 94 of the wind direction adjusting unit 93 to be substantially parallel with the finger insertion direction. Then, the heater 91 and the fan 92 are caused to operate and wind heated by the heater 91 is blown on a range that has a width approximately the same as the width of the fan 92.

Additionally, when the drying condition determination portion 813 determines that the area of the surface of the nail T (drawing object) to which the ink has been applied is "wide", as illustrated in FIG. 2D, the drying control portion 814 is configured to contract the power cylinders 97 so that the rods 971 become as short as possible and greatly widen the blades 94 of the wind direction adjusting unit 93 to the left and right. Then, the heater 91 and the fan 92 are caused to operate and wind heated by the heater 91 is blown on a range that is wider than the width of the fan 92.

Additionally, when the drying condition determination portion 813 determines that the area of the surface of the nail T (drawing object) to which the ink has been applied is “narrow”, as illustrated in FIG. 2E, the drying control portion 814 is configured to extend the power cylinders 97 so that the rods 971 become as long as possible and narrow the aperture of the drying unit 90 formed by the blades 94 of the wind direction adjusting unit 93 so as to be narrower than the width of the fan 92. Then, the heater 91 and the fan 92 are caused to operate and wind heated by the heater 91 is blown on a range that is narrower than the width of the fan 92.

Note that, as described previously, in cases where the drying condition determination portion 813 acquires only a value representing the area of the surface of the nail T (drawing object) to which the ink has been applied in a stepless manner, the drying control portion 814 performs control so as to cause the angle of the blades 94 of the wind direction adjusting unit 93 to change in a stepless manner, in accordance with the value acquired by the drying condition determination portion 813.

The drawing data generation portion 815 generates data for the drawing to be performed by the drawing head 43 on the nail T of the print finger U1, on the basis of the nail information detected by the nail information detection portion 812.

Specifically, on the basis of the shape of the nail T and the like detected by the nail information detection portion 812, the drawing data generation portion 815 performs calibration processing, such as enlarging, reducing, and cropping, for calibrating the image data of the nail design to the shape of the nail T.

The drawing data generation portion 815 performs appropriate curve correction and the like in accordance with the nail information detected by the nail information detection portion 812.

As a result, drawing data for the nail design to be drawn by the pen 41 or the ink jet drawing portion 71 is generated.

The display control portion 816 is configured to control the display unit 26 and cause the display unit 26 to display various types of display screens. In the present embodiment, examples of the various types of display screens the display control portion 816 is configured to display on the display unit 26 include nail design selection screens and thumbnail images for confirming designs, nail images acquired by imaging the print finger U1, various command screens, operation screens, and the like.

The drawing control portion 817 is a control portion that outputs control signals to the drawing unit 40 on the basis of the drawing data generated by the drawing data generation portion 815, and controls the X-direction movement motor 46, the Y-direction movement motor 48, the pen vertical motor 426, the ink jet drawing portion 71, and the like of the drawing unit 40, so as to perform a drawing on the nail T that corresponds with the drawing data.

Specifically, when the pen 41 is not drawing, the drawing control portion 817 controls the pen vertical motor 426 so as to maintain a state in which the retaining protrusion 424 is not pressed down by the plate spring 429; and, when the pen is drawing, the drawing control portion 817 causes the pen vertical motor 426 to operate and controls the operation of the pen vertical motor 426 so that the retaining protrusion 424 is pressed down by the plate spring 429 and the tip side (the pen tip 413) of the pen 41 comes into contact with the surface of the nail T.

Note that at locations where the height of the nail T changes greatly and cannot be accommodated by the flexible deformation (elastic deformation) of the plate spring 429 alone, the drawing control portion 817 preferably causes the number of steps of the pen vertical motor 426 to be increased or decreased, thus adjusting the pen pressure of the pen 41 so that the pen pressure becomes substantially constant.

Figure 5:
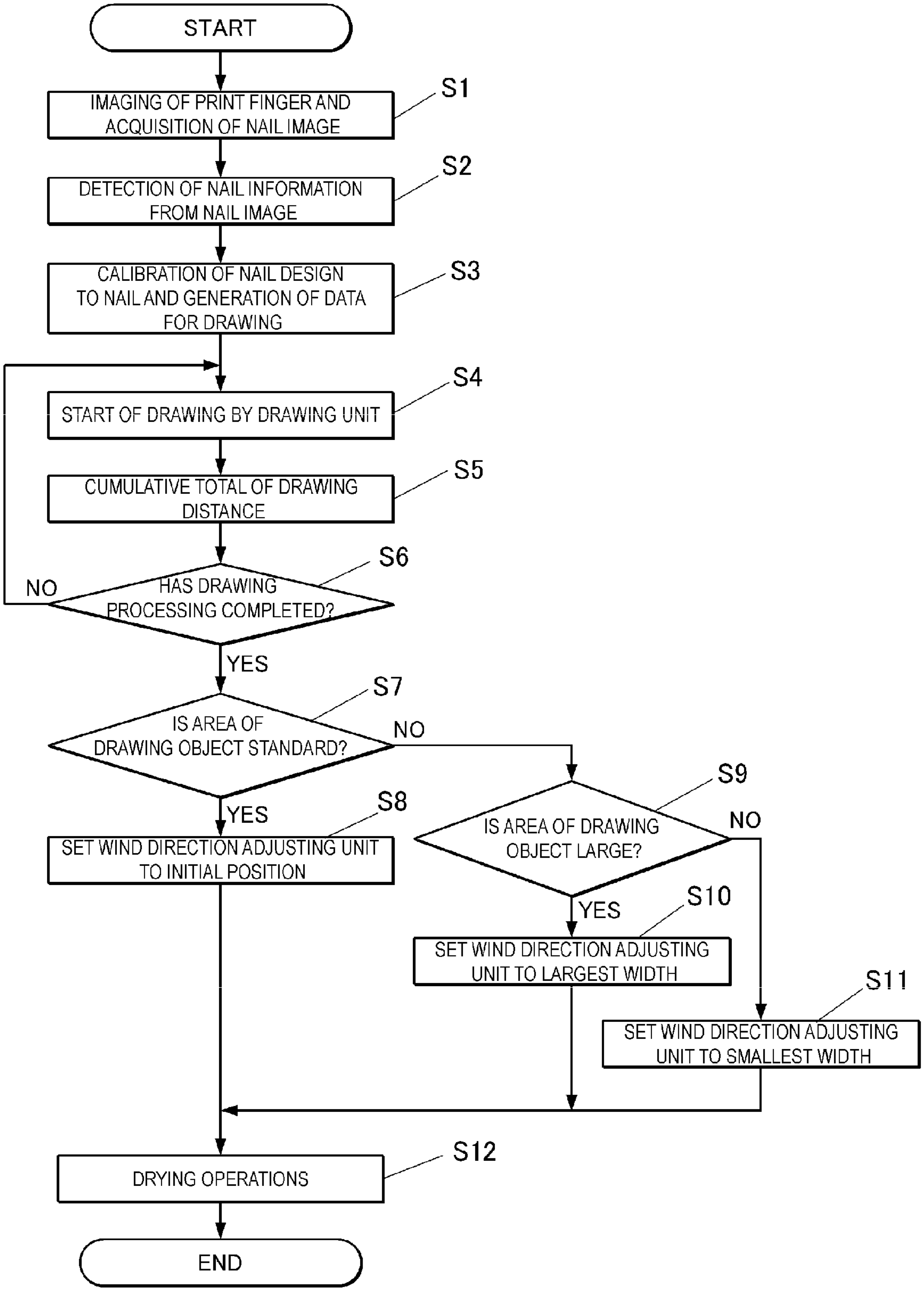
FIG. 5 is a flowchart showing drawing processing according to a first embodiment.

Next, a drawing method by the nail printing apparatus 1 according to the present embodiment is described while referencing FIG. 5.

In cases where performing drawing using the nail printing apparatus 1, a user first operates a power switch to turn on the control device 80.

The display control portion 816 causes a design selection screen to be displayed on the display unit 26, and the user operates operation buttons or the like on the operation unit 25 and selects a desired nail design from among a plurality of nail designs displayed on the design selection screen. As a result, a selection command signal is output from the operation unit 25 and the nail design intended to be drawn on the nail T is selected.

Upon selection of the nail design, the display control portion 816 displays a command screen on the display unit 26 prompting that the pen 41 required to draw the desired nail design be set in a predetermined pen holder 42 of the drawing head 43. In accordance with the command displayed on the display screen, the user sets a predetermined type of the pen 41 in the predetermined pen holder 42. A configuration is possible in which, at this time, the user inputs information (the type of ink stored in the pen 41, or the like) related to the pen 41 set in the pen holder 42 from the operation unit 25 or the like. In cases where the information related to the pen 41 is inputted, the input information is output to the control unit 81.

Next, the display control portion 816 causes the display unit 26 to display a command screen prompting that the print finger U1 be set in the finger receiving portion 31. The user operates a drawing switch (not illustrated) of the operation unit 25 after inserting the print finger U1 into the finger receiving portion 31, inserting the non-print fingers U2 into the finger clearing portion 32, and securing the print finger U1 to the finger receiving portion 31.

Upon the input of the command from the drawing switch and prior to beginning the drawing operation, as shown in FIG. 5, first, the imaging control portion 811 controls the imaging unit 50 and causes the two image capturing devices 51 to image the print finger U1 while illuminating the print finger U1 using the illumination device 52. As a result, the imaging control portion 811 acquires images of the nail T (nail images) of the print finger U1 that has been inserted into the finger receiving portion 31 (step S1).

Next, the nail information detection portion 812 detects the nail information such as the outline (nail shape) of the nail T and the inclination angle (nail curvature) of the nail T on the basis of the nail images (step S2).

Upon detection of the outline (nail shape) of the nail T and the inclination angle (nail curvature) of the nail T by the nail information detection portion 812, the drawing data generation portion 815 performs fitting (calibration processing) of the image data of the nail design to the nail T, on the basis of the nail information (step S3). Additionally, the drawing data generation portion 815 performs curvature correction on the image data of the nail design, on the basis of the nail information. As a result, the drawing data is generated.

Upon generation of the drawing data, the drawing control portion 817 outputs the drawing data to the drawing unit 40 and causes the head movement portion 49 to operate and move the drawing head 43 to a position above the surface of the nail T or, rather, to a position above the drawing start position of the selected nail design, and start the drawing (step S4).

Specifically, in cases where drawing using the ink jet drawing portion 71, the drawing control portion 817 controls the ink jet drawing portion 71 and discharges ink in accordance with the drawing data.

Additionally, in cases where drawing using the pen 41, the drawing control portion 817 causes the drawing to be performed by appropriately moving the pen 41 in the X direction, the Y direction, and the height direction.

In the present embodiment, the drawing distance is totaled while the drawing is being performed (step S5).

The drawing control portion 817 makes a determination as to whether the drawing processing is completed for the entire nail T (step S6) and, in cases where it is determined that the drawing processing is not complete (step S6; NO), the processing is repeated from step S4. Additionally, in cases where it is determined that the drawing processing is completed (step S6; YES), the drawing processing for that nail T is completed.

Upon completion of the drawing processing, the drying condition determination portion 813 determines whether or not the area of the surface of the nail T (the drawing object) to which the ink has been applied is "standard" (step S7).

In the present embodiment, specifically, the drying condition determination portion 813 acquires the cumulative total of the drawing distance and determines whether or not this cumulative total is within a range of a predetermined threshold where the area of the drawing object is classified as "standard".

Moreover, in cases where the drying condition determination portion 813 determines that the cumulative total is "standard" (step S7; YES), the drying control portion 814 sets the power cylinders 97 of the wind direction adjusting unit 93 to the initial position (step S8). As a result, the width of the aperture (the blowing port) of the drying unit 90 formed by the blades 94 is set to substantially the same as the width of the fan 92.

On the other hand, in cases where the cumulative total is determined not to be "standard" (step S7; NO), the drying condition determination portion 813 further determines whether or not the area of the surface of the nail T (the drawing object) to which the ink has been applied is "large", that is, if the area is greater than or equal to a predetermined threshold that defines an upper limit for the "standard" area (step S9).

Then, in cases where the drying condition determination portion 813 determines that the area of the drawing object is "large" (step S9; YES), the drying control portion 814 contracts the power cylinders 97 of the wind direction adjusting unit 93 to the position where the rods 971 become as short as possible, thereby setting the wind direction adjusting unit 93 to the greatest width (step S10). As a result, the width of the aperture (the blowing port) of the drying unit 90 formed by the blades 94 is set to wider than the width of the fan 92.

Additionally, in cases where the drying condition determination portion 813 determines that the area of the drawing object is "not large" (step S9; NO), that is, in cases where it is determined that the area is less than or equal to a predetermined threshold value that defines a lower limit for the "standard" area, the drying control portion 814 extends the power cylinders 97 of the wind direction adjusting unit 93 to the position where the rods 971 become as long as possible, thereby setting the wind direction adjusting unit 93 to the smallest width (step S11). As a result, the width of the aperture (the blowing port) of the drying unit 90 formed by the blades 94 is set to narrower than the width of the fan 92.

As described above, upon completion of the setting of the wind direction adjusting unit 93 in accordance with the determination by the drying condition determination portion 813 of the area of the surface of the nail T (the drawing object) to which the ink has been applied, the drying control portion 814 performs the drying operations by causing the heater 91 and the fan 92 to operate (step S12).

Moreover, upon the drying operations being performed for a predetermined period of time (e.g. 30 seconds), the drying control portion 814 stops the heater 91 and the fan 92.

Note that in cases where further drawing is to be performed on the nail T using a different type of the pen 41 or the like, the processing is repeated from step S4. Additionally, in cases where all of the drawing for the nail T has been completed, the user is notified of the completion of the drawing, and a display screen or the like instructing the user to remove the fingers from the apparatus is displayed on the display unit 26.

As described above, according to the present embodiment, in cases where a drawing is to be performed on the surface of the nail T by applying the liquid material, namely the ink, to the drawing object, namely the surface of the nail T, and the ink that has been applied to the surface of the nail T is to be dried by the drying unit 90, the drying condition is determined by the drying condition determination portion 813 and the drying operations of the drying unit 90 are controlled on the basis of the results of determining the drying condition by the drying condition determination portion 813.

Therefore, power consumption and the like can be minimized and drying can be efficiently performed. Additionally, due to the fact that just enough drying is performed, the burden on the user can be minimized and nail printing that is expedited and that has a beautiful finish can be realized.

Particularly, in the present embodiment, the size of the area of the surface of the nail T to which the ink has been applied is determined as the drying condition and the drying operations of the drying unit 90 are controlled in accordance with this determination result.

The size of the nail T differs between the thumb and the little finger of a given user. Additionally, the size of the nail T differs greatly on the basis of whether the user is an adult or a child. Furthermore, even for the same nail T, the size of the region to which the ink is applied and where drying is required depends on the nail design. Even in cases such as these in which the area where drying is required differs, the drying operations can be performed efficiently and effectively without unnecessary blowing. As a result, warm air can be blown and drying can be performed regardless of the nail design that is to be drawn and regardless of the size of the nail on which the drawing is to be performed.

Additionally, in the present embodiment, the drying unit 90 includes the fan 92 and the wind direction adjusting unit 93 that adjusts the direction of wind generated by the fan 92; and the drying control portion 814 is configured to control the wind direction adjusting unit 93 so as to change the range across which the wind generated by the fan 92 is spread, in accordance with the determination by the drying condition determination portion 813. Thus, even in cases where the size of the nail T differs and/or in cases where the ink application range on the nail T varies, just enough air can be blown across the required range and the drying operations can be efficiently performed.

Particularly, in cases where drawing a long line in the width direction of the nail (e.g. a line drawn at the division of a French manicured nail or the like), or in cases where the nail T of the user is a nail T that is long in the width direction, the fact that the direction of the wind generated by the fan 92 is adjusted yields significant benefits.

Second Embodiment

Next, a second embodiment of the nail printing apparatus (drawing apparatus) and drawing method for the nail printing apparatus (drawing apparatus) according to the present invention are described below while referring to FIGS. 6 to 11. In the following embodiment, points that particularly differ from the first embodiment will be described.

In the present embodiment, description will be centered on the control of the drying unit 90 in cases where drawing is performed by the ink jet drawing portion 71 that discharges and lands the liquid material, namely the ink, on the drawing object, namely the surface of the nail T.

In cases where performing a drawing on the nail T by using the ink jet drawing portion 71, first, as in the first embodiment, on the basis of the shape and the like of the nail T detected by the nail information detection portion 812, the drawing data generation portion 815 performs calibration processing such as enlarging, reducing, and cropping, for calibrating the image data of the nail design to the shape of the nail T. Furthermore, on the basis of the nail information detected by the nail information detection portion 812, the drawing data generation portion 815 generates image data consisting of RGB pixel data as the image data for drawing for cases where drawing a nail design is performed on the nail T by performing appropriate nail curvature correction and the like.

Furthermore, the drawing data generation portion 815 converts this image data for drawing (the image data consisting of the RGB pixel data) into output data of the nozzles of the ink jet drawing portion 71. This output data consists of dot patterns for each CMY color (i.e. cyan (C), magenta (M), and yellow (Y)), and gradation is expressed by the density of the dots.

Figure 6:
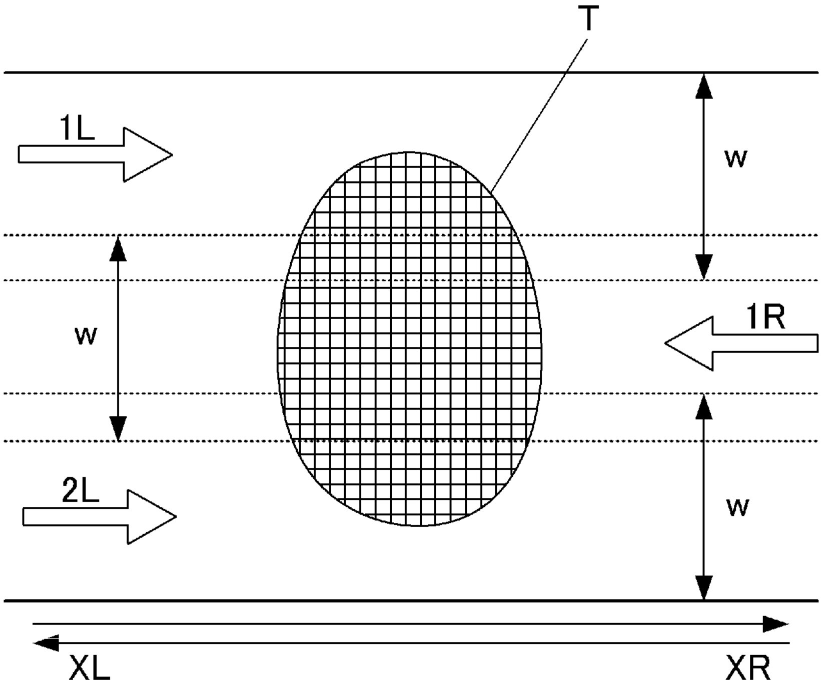
FIG. 6 is an explanatory drawing for explaining a drawing technique in a case where drawing is performed on a nail by an ink jet drawing portion in a second embodiment.

FIG. 6 is an explanatory drawing for explaining a drawing technique in a case where drawing is performed on a nail by the ink jet drawing portion according to the present embodiment.

FIG. 6 illustrates an image of the output data of the nozzles of the ink jet drawing portion 71, which is generated by the drawing data generation portion 815.

As illustrated in FIG. 6, in the output data of the nozzle, output data of the nozzles is disposed in which, for example, rectangular background images are fitted to the nail shape. The background color of the rectangular background images is preferably white. The portion of the background that is white is comprised of pixels where the CMY color inks are not discharged as the output data of the nozzles of the ink jet drawing portion 71.

Note that in FIG. 6 and the like, XL is a coordinate representing the printable edge on the left side in the X direction (lateral direction) of the apparatus, and XR is a coordinate representing the printable edge on the right side in the X direction (lateral direction) of the apparatus.

The ink jet drawing portion 71 performs the drawing by appropriately discharging CMY (i.e. cyan (C), magenta (M), and yellow (Y)) ink from the plurality of nozzles of the ink jet head while moving from XL to XR or XR to XL. Note that one movement from XL to XR or XR to XL is also referred to below as “one scan”.

In FIG. 6, a drawing width w is a width that the ink jet drawing portion 71 can draw in one scan (one movement in the X direction).

As described in the first embodiment, the ink jet drawing portion 71 has an ink discharging portion that is provided with a nozzle array in which a plurality of nozzles are arranged in a row. As such, the number of nozzles (“nz” in FIGS. 7A to 7C) multiplied by the width dimension of the nozzles (“d” in FIGS. 7A to 7C) is the length of the nozzle row of the ink jet drawing portion 71, and is the drawing width w. Note that the quantity of the nozzle row of the ink jet drawing portion 71 may also be calculated by multiplying the number of pixels of the dimension of the nozzles by the number of nozzles per pixel.

Additionally, in FIG. 6, 1L, depicted by a white arrow, represents a first scan where the ink jet drawing portion 71 moves from XL to XR (first scan, first scan from XL to XR), and 1R, also depicted by a white arrow, represents a second scan where the ink jet drawing portion 71 moves from XR to XL (second scan, first scan from XR to XL). Additionally, 2L represents a third scan where the ink jet drawing portion 71 returns from XL to XR (third scan, second scan from XL to XR).

As illustrated in FIG. 6, in one scan, the ink jet drawing portion 71 of the present embodiment performs drawing one drawing width w at a time and is configured to complete the drawing on one nail T by moving 1 ½ round trips between XL and XR while slightly overlapping the edges of the drawing widths w such that non-coating and/or gaps do not occur between each scan.

Note that the number of scans by which the drawing is performed on one nail T is set in accordance with the length of the nozzle row, that is, the drawing width w. The nail area is appropriately divided (three sections in the present embodiment) in accordance with the set number of scans, and the drawing data generation portion 815 generates output data for the nozzles so as to conform to each nail area.

Figure 7A:
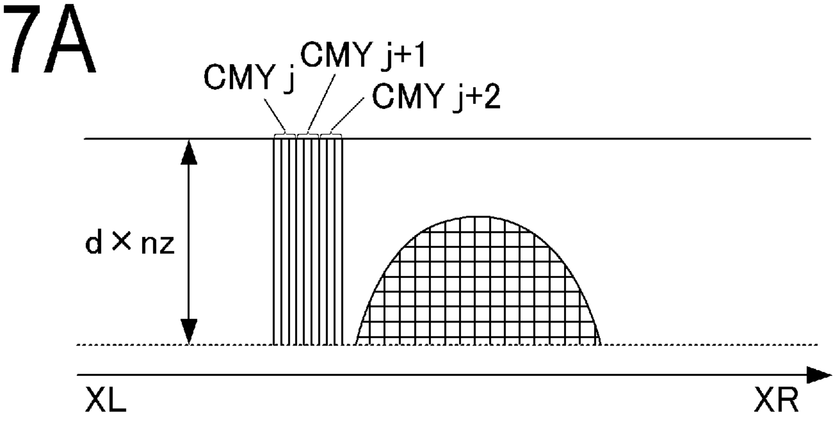
FIGS. 7A to 7C are explanatory drawings schematically illustrating a configuration of output data of nozzles of the ink jet drawing portion.
Figure 7B:
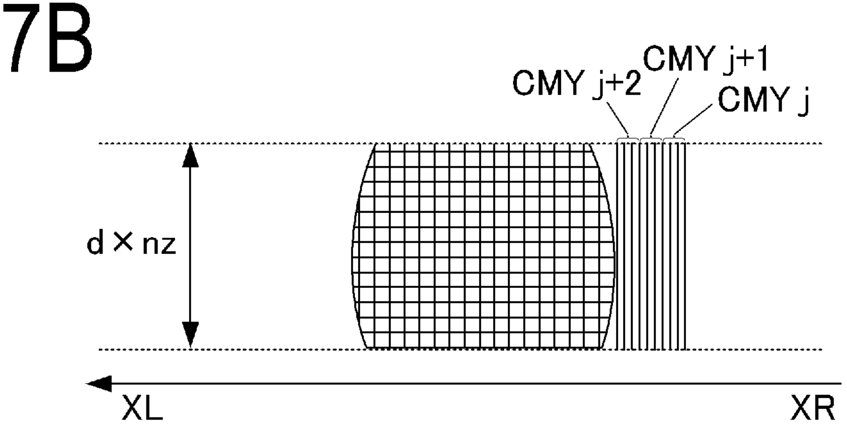
Figure 7C:
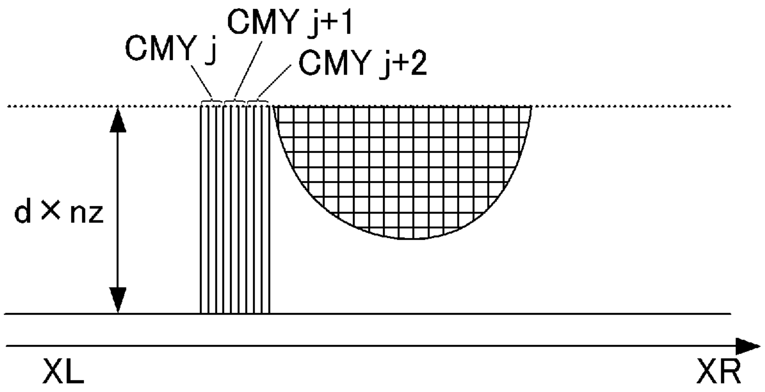

FIGS. 7A to 7C are explanatory drawings schematically illustrating the configuration of the output data of the nozzles of the ink jet drawing portion.

In FIGS. 7A to 7C, the number of data in the range in the lateral direction where the drawing is to be performed (from XL to XR) is the same as the width of the RGB pixel data. Additionally, output patterns of the nozzles of each CMY color are arranged in the vertical direction. The number of data in the vertical direction is the number of nozzles that discharge at the same timing when drawing one pixel in the lateral direction (X direction). When the number of data in the vertical direction is a numerical value of the number of nozzles and is the number of nozzles (nz) corresponding to one pixel, the number of data in the vertical direction is d×nz.

In the drawings, from upstream toward downstream in the movement direction of the ink jet drawing portion 71, the $j^{th}$ row is indicated as CMYj, the $j+1^{th}$ row is indicated as CMY j+1, the $j+2^{th}$ row is indicated as CMY j+2, and so on. An output data row of C (cyan) color, an output data row of M (magenta) color, and an output data row of Y (yellow) color are illustrated as being disposed for each row (i.e. the $j^{th}$ row, the $j+1^{th}$ row, $j+2^{th}$ row, and so on).

Note that in the following description, dots where the ink is discharged from the nozzles are referred to as “effective dots”, and dots where the ink is not discharged from the nozzles are referred to as “invalid dots”.

FIG. 7A is a drawing explaining output data corresponding to a first drawing region drawn by the ink jet drawing portion 71 in the first scan (1L in FIG. 6) from XL to XR in FIG. 6; FIG. 7B is a drawing explaining output data corresponding to a second drawing region drawn by the ink jet drawing portion 71 in the second scan (1R in FIG. 6) from XR to XL in FIG. 6; and FIG. 7C is a drawing explaining output data corresponding to a third drawing region drawn by the ink jet drawing portion 71 in the third scan (2L in FIG. 6) from XL to XR in FIG. 6.

The color of each pixel is determined by the concentration of the distribution of the effective dots of each color in the output data. For example, for dark colors, the number of effective dots of the output data is increased per unit area, and for light colors, the number of effective dots is decreased. For white, the number of effective dots is zero.

Additionally, for data rows where there is no nail area and drawing processing is not performed, there are no effective dots and only invalid dots; and, the greater the proportion of the nail area where the drawing processing is performed, the greater the proportion of effective dots.

Furthermore, the number of effective dots within the nail area increases or decreases depending on the color scheme of the nail design. The number of effective dots decreases for a monochromatic component of CMY and, with colors expressed by mixing the CMY colors, the number of effective dots increases in correlation with the multiple types of colors that must be mixed to express these colors.

In the present embodiment, the drying condition determination portion 813 determines the drying condition in accordance with the distribution state of the effective dots where the discharging of the ink from the ink jet drawing portion 71 is to be performed.

Specifically, the drying condition determination portion 813 detects if the effective dots are distributed in the range from XL to XR in the X direction (the lateral direction), and determines the drying condition in accordance with the application range of the ink to be applied to the drawing object, namely the surface of the nail T.

Figure 8A:
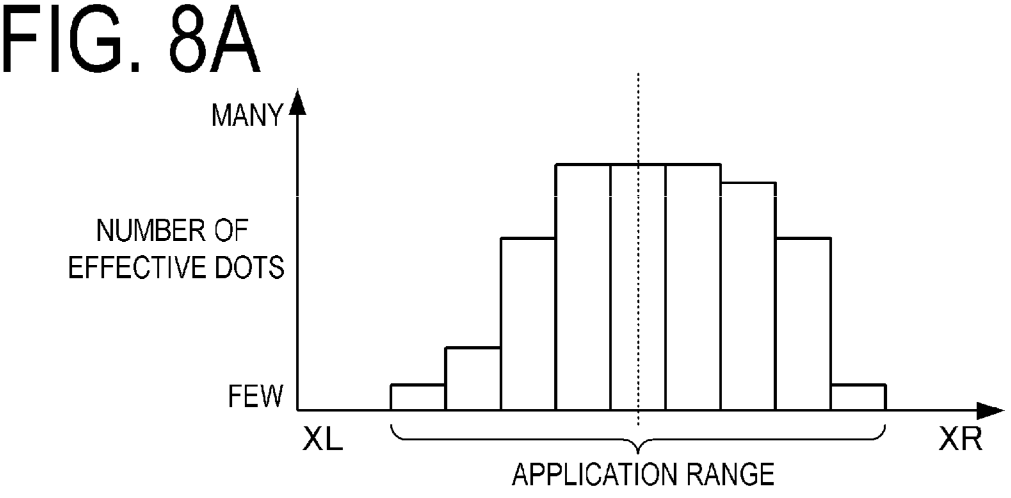
FIGS. 8A to 8C are explanatory drawings illustrating examples of drying parameters in cases where drying control is performed in accordance with an ink application range.
Figure 8B:
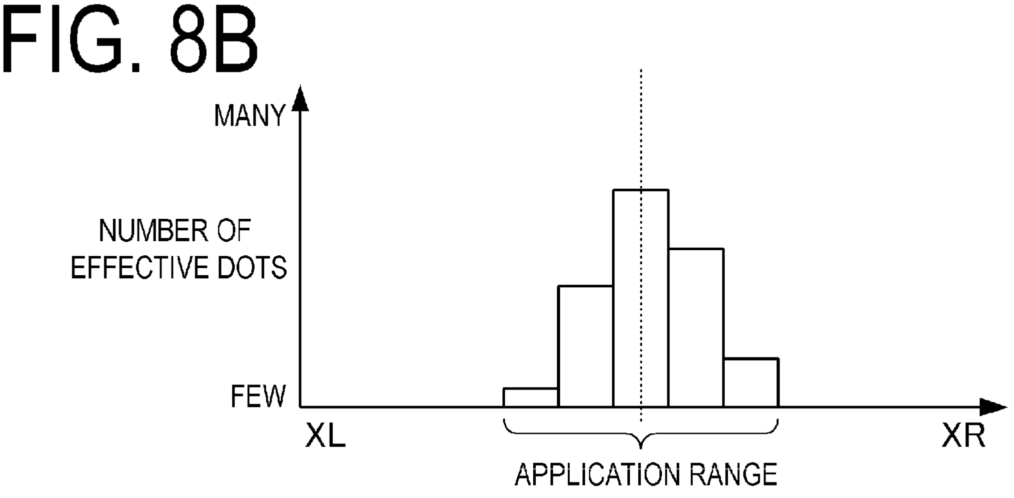
Figure 8C:
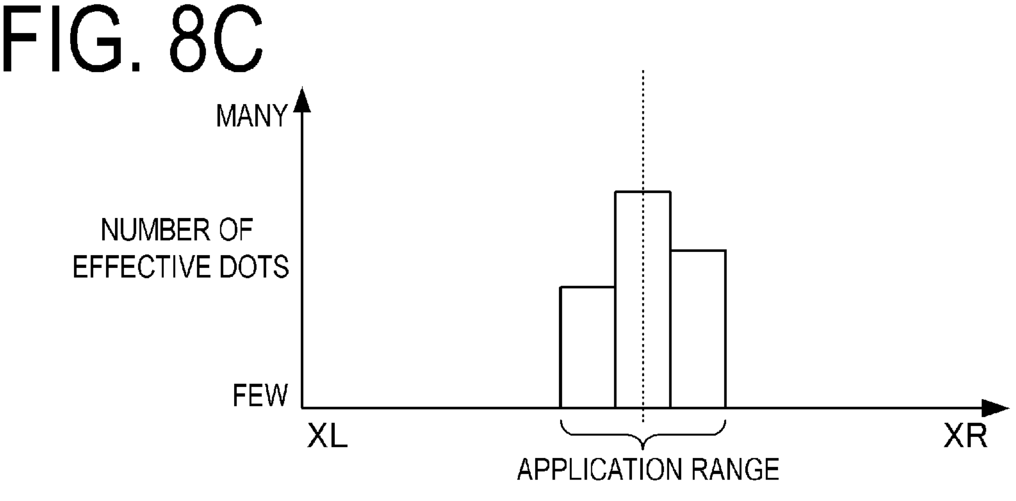

FIGS. 8A to 8C are histograms in which the coordinates in the X direction (XL to XR) are shown on the horizontal axis and the number of effective dots of the output data at each X coordinate is shown on the vertical axis.

Note that in FIGS. 8A to 8C, the vertical line depicted as a dashed line represents the center in the X direction of the aperture of the drying unit 90.

FIG. 8A illustrates an example of a case in which the ink application range in the X-axis direction (that is, the distribution range of the effective dots) is wide; FIG. 8C illustrates an example of a case in which the ink application range in the X-axis direction (that is, the distribution range of the effective dots) is narrow; and FIG. 8B illustrates an example of a case in which the ink application range in the X-axis direction (that is, the distribution range of the effective dots) is medium.

For example, in cases where the histogram is that such as in FIG. 8A, it is preferable that the blowing for drying be performed across a wide range, because drying irregularities and the like will occur if the range is narrow. As such, the drying condition determination portion 813 sets drying parameters for a large ink application range.

In cases where the histogram is that such as in FIG. 8C, it is preferable that the blowing for drying be performed across a narrow range, because the interior of the apparatus will become exceedingly hot and power consumption efficiency will be poor if blowing is performed across a wide range. As such, the drying condition determination portion 813 sets the drying parameters for a small ink application range.

In cases where the histogram is that such as in FIG. 8B, it is preferable that the blowing for drying be performed across a medium range, because the interior of the apparatus will become exceedingly hot and power consumption efficiency will be poor if blowing is performed across a wide range. Conversely, drying irregularities and the like will occur if the blowing is only performed across a narrow range. As such, the drying condition determination portion 813 sets the drying parameters for a medium ink application range.

The lower value at which the ink application range is determined to be a “large ink application range”, and the upper value at which the application range of the ink is determined to be a “small ink application range” are appropriately set in accordance with the usage specifications of the apparatus. For example, thresholds are set beforehand and the drying condition determination portion 813 references these thresholds to perform the determination and, thereby, sets the drying parameters.

Here, cases where the drawing object is the nail T of a large finger with a wide lateral width such as a thumb or the like are cases where the ink application range is determined as “large”; and cases where the drawing object is the nail T of a small finger with a narrow lateral width such as a finger of a child, a little finger, or the like are cases where the ink application range is determined as “small”. Cases where the drawing object is the nail T of a finger with a medium lateral width such as a middle finger or the like are cases where the ink application range is determined as “medium”.

Figure 9:
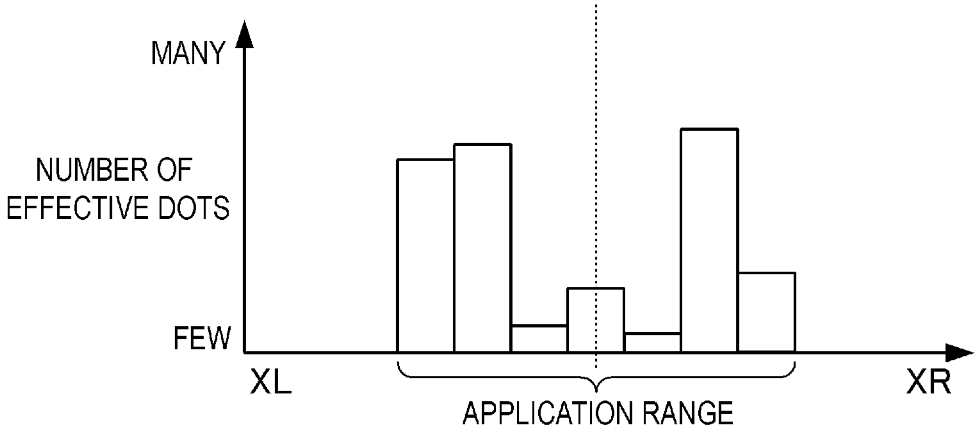
FIG. 9 is an explanatory drawing illustrating an example of a drying parameter in a case where an ink application amount across the entire nail varies.
Figure 10:
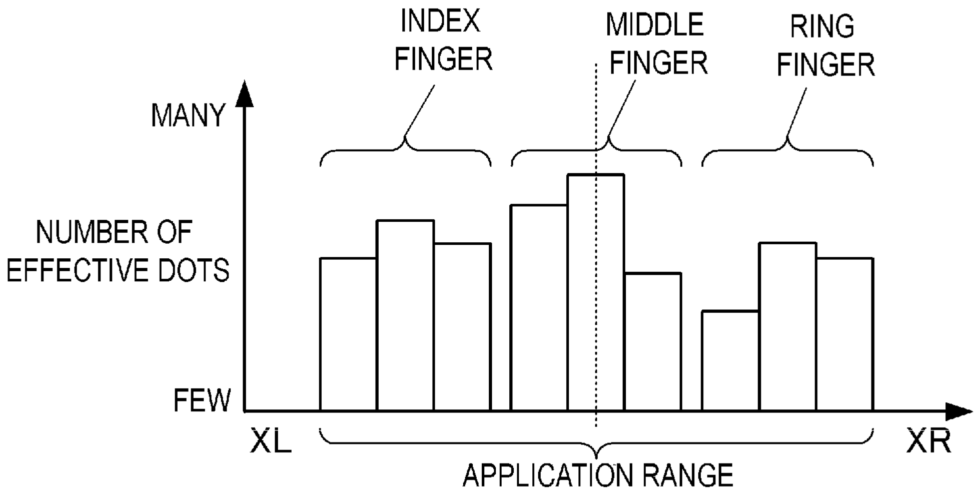
FIG. 10 is an explanatory drawing illustrating an example of a drying parameter in a case where a drawing is performed on nails of a plurality of fingers.

Note that in cases where performing drawing on the nails T of a plurality of fingers such as in FIG. 9, where drawing is performed by simultaneously inserting three fingers, namely the index finger, the middle finger, and the ring finger into the finger receiving portion 31 of the nail printing apparatus 1, the ink application range widens and is determined to be a “large ink application range”.

Additionally, in the present embodiment, the drying condition determination portion 813 sets the drying parameters by determining the size of the ink application range using the distribution state of the effective dots.

Therefore, for example, even in cases where the number of effective dots in the ink application range at both sides in the X direction is great and the number of effective dots in a center portion in the X direction is small as illustrated in FIG. 9, the ink application range is determined and the drying parameters are set according to the range across which the effective dots are distributed.

As such, for example, even in cases where a nail design is drawn using dark colors throughout from the left edge to the right edge of the nail T, and also in cases where the nail design includes patterns drawn with dark colors on both sides of the nail T and only a light color is applied in the middle portion of the nail T, the ink application range is determined to be “large” and drying parameters for the “large ink application range” are set.

As in the first embodiment, the drying control portion 814 controls the drying operations of the drying unit 90 in accordance with the determination by the drying condition determination portion 813.

In the present embodiment, when the drying condition determination portion 813 determines that the ink application range is “large” and sets drying parameters for the “large ink application range”, the drying control portion 814 is configured to contract the power cylinders 97 so that the rods 971 become as short as possible and greatly widen the blades 94 of the wind direction adjusting unit 93 to the left and right. Then, the heater 91 and the fan 92 are caused to operate and wind heated by the heater 91 is blown on a range that is wider than the width of the fan 92.

Additionally, when the drying condition determination portion 813 determines that the ink application range is "medium" and sets drying parameters for the "medium ink application range", the drying control portion 814 is configured to set the power cylinders 97 to the initial position and adjust all of the blades 94 of the wind direction adjusting unit 93 so as to be substantially parallel to the finger insertion direction. Then, the heater 91 and the fan 92 are caused to operate and wind heated by the heater 91 is blown on a range that has a width approximately the same as the width of the fan 92.

Additionally, when the drying condition determination portion 813 determines that the ink application range is "small" and sets drying parameters for the "small ink application range", the drying control portion 814 is configured to extend the power cylinders 97 so that the rods 971 become as long as possible and narrow the aperture of the drying unit 90 formed by the blades 94 of the wind direction adjusting unit 93 so as to be narrower than the width of the fan 92. Then, the heater 91 and the fan 92 are caused to operate and wind heated by the heater 91 is blown on a range that is narrower than the width of the fan 92.

Other configurations are the same as in the first embodiment and, as such, descriptions thereof are omitted.

Figure 11:
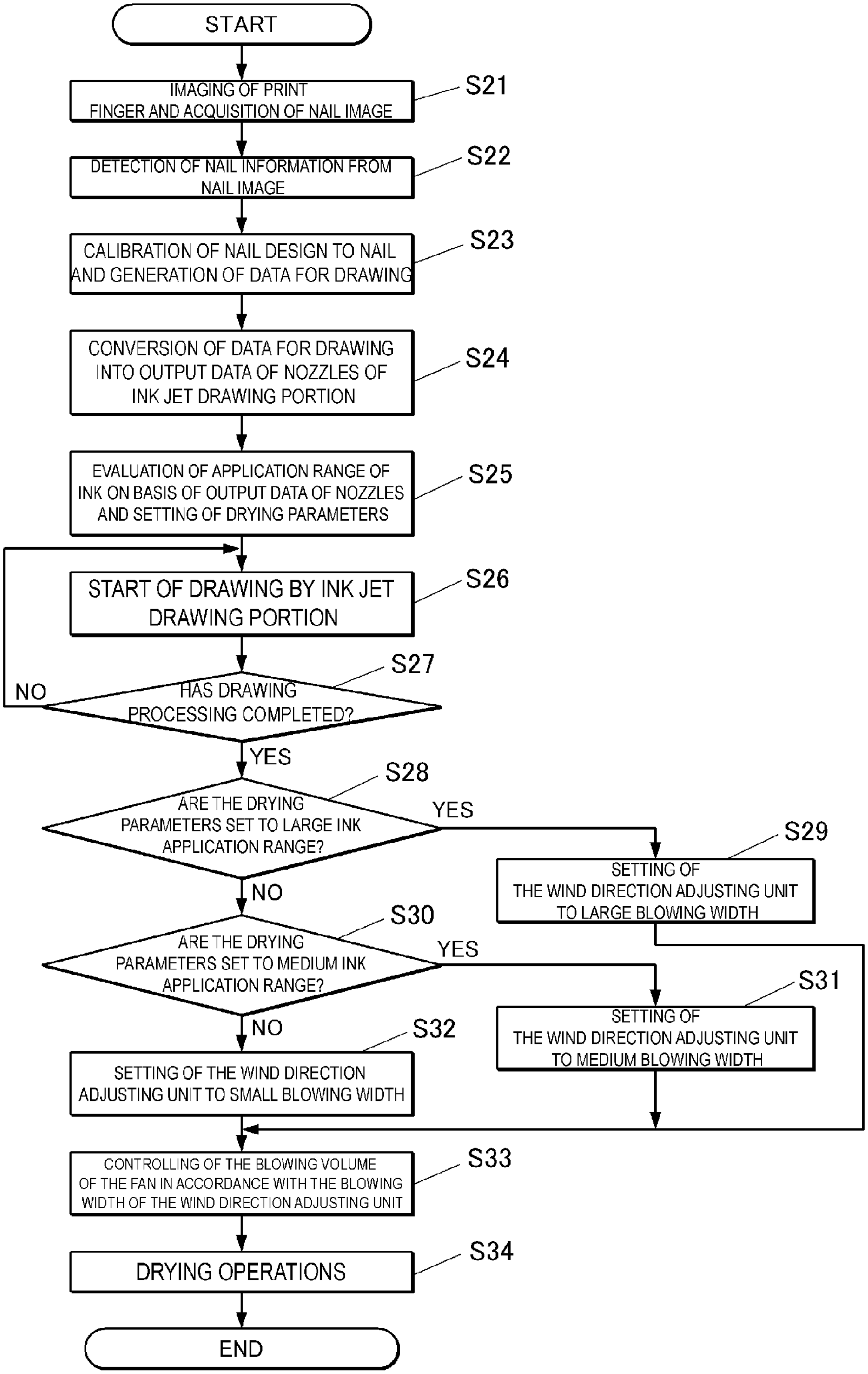
FIG. 11 is a flowchart showing drawing processing in the second embodiment of the present invention.

Next, a drawing method by the nail printing apparatus 1 according to the present embodiment is described while referencing FIG. 11.

First, as in the first embodiment, the nail design is calibrated to the drawing object, namely the nail T, and curvature correction and the like is appropriately performed. Thus, the image data for drawing is generated (steps S21 to S23).

Next, the drawing data generation portion 815 converts the image data for drawing into the output data of the nozzles of the ink jet drawing portion 71 (step S24).

Then, the drying condition determination portion 813 evaluates the ink application range on the basis of the output data of the nozzles and sets the drying parameters for the large application range, the drying parameters for the medium application range, or the drying parameters for the small application range (step S25).

Upon generation of the output data of the nozzles, the drawing control portion 817 outputs the output data to the drawing unit 40 and causes the head movement portion 49 to operate and move the drawing head 43 to a position above the surface of the nail T or, rather, to a position above the drawing start position of the selected nail design and start the drawing (step S26).

Specifically, in cases where drawing by using the ink jet drawing portion 71, the drawing control portion 817 controls the ink discharging operations from the nozzles of the ink jet drawing portion 71 and discharges ink from the nozzles in accordance with the drawing data.

The drawing control portion 817 determines whether or not the drawing processing is completed for the entire nail T (step S27) and, in cases where it is determined that the drawing processing is not complete (step S27; NO), the processing is repeated from step S26. Additionally, in cases where it is determined that the drawing processing is complete (step S27; YES), the drawing processing for that nail T is completed.

Upon completion of the drawing processing, the drying control portion 814 determines whether or not the drying parameters are set to the "large ink application range" (step S28). Then, in cases where the drying parameters are set to the "large ink application range" (step S28; YES), the drying control portion 814 sets the wind direction adjusting unit 93 to a blowing width of "large" (step S29). Specifically, the drying control portion 814 contracts the power cylinders 97 of the wind direction adjusting unit 93 to the position where the rods 971 become as shot as possible, thereby setting the wind direction adjusting unit 93 to the greatest width. As a result, the width of the aperture (the blowing port) of the drying unit 90 formed by the blades 94 is set to wider than the width of the fan 92.

On the other hand, in cases where the drying parameters are not set to the "large ink application range" (step S28; NO), the drying control portion 814 determines whether or not the drying parameters are set to the "medium ink application range" (step S30). In cases where the drying parameters are set to the "medium ink application range" (step S30; YES), the drying control portion 814 sets the wind direction adjusting unit 93 to a blowing width of "medium" (step S31). Specifically, the drying control portion 814 sets the power cylinders 97 of the wind direction adjusting unit 93 to the initial position. As a result, the width of the aperture (the blowing port) of the drying unit 90 formed by the blades 94 is set to substantially the same as the width of the fan 92.

On the other hand, in cases where the drying parameters are not set to the "medium ink application range" (step S30; NO), the drying control portion 814 determines that the drying parameters are set to the "small ink application range", and sets the wind direction adjusting unit 93 to a blowing width of "small" (step S32). Specifically, the drying control portion 814 extends the power cylinders 97 of the wind direction adjusting unit 93 to the position where the rods 971 become as long as possible, thereby setting the wind direction adjusting unit 93 to the smallest width. As a result, the width of the aperture (the blowing port) of the drying unit 90 formed by the blades 94 is set to narrower than the width of the fan 92.

Furthermore, the drying control portion 814 controls a blowing volume of the fan 92 in accordance with the blowing width of the wind direction adjusting unit 93 (step S33).

That is, in cases where the blowing width of the wind direction adjusting unit 93 is enlarged, the wind is dispersed across a wider range by the amount corresponding to that enlargement. Therefore, unless the blowing volume is increased, it will not be possible to ensure the blowing volume needed for the entire nail T. As such, in cases where the blowing volume when the blowing width of the wind direction adjusting unit 93 is set to medium is the standard, when the blowing width of the wind direction adjusting unit 93 is set to "large", the operations of the fan 92 are controlled so as to increase the blowing volume by increasing the voltage value applied to the fan 92 to greater than that applied for the standard blowing volume.

Additionally, in cases where the blowing width of the wind direction adjusting unit 93 is reduced, the wind is concentrated across a narrower range by the amount corresponding to that reduction. Therefore, unless the blowing volume is reduced, the wind pressure that hits the nail T will be excessively strong. As such, in cases where the blowing width of the wind direction adjusting unit 93 is set to "small", the operations of the fan 92 are controlled so as to reduce the blowing volume by reducing the voltage value applied to the fan 92 to less than that applied for the standard blowing volume. As a result, the need to apply unnecessarily high voltage is eliminated and power can be conserved.

As described above, upon completion of the setting of the wind direction adjusting unit 93 in accordance with the drying condition determined by the drying condition determination portion 813 in accordance with the application range of the ink to be applied to the surface of the nail T (the drawing object), the drying control portion 814 performs the drying operations by causing the heater 91 and the fan 92 to operate (step S34).

Moreover, upon the drying operations being performed for a predetermined period of time (e.g. 30 seconds), the drying control portion 814 stops the heater 91 and the fan 92.

Other aspects of the present embodiment are the same as in the first embodiment and, as such, descriptions thereof are omitted.

As described above, according to the present embodiment, in addition to the same benefits as in the first embodiment being obtained, the following additional benefits can be obtained.

Specifically, in the present embodiment, in the case where the drawing head that performs the drawing on the nail T is the ink jet drawing portion 71 that discharges and lands the liquid material, namely the ink, on the drawing object, namely the nail T, the drying condition determination portion 813 is configured to determine the drying condition in accordance with the distribution state of the effective dots where the discharging of the ink from the ink jet drawing portion 71 is to be performed.

Therefore, even in cases where the drawing is to be performed by the ink jet drawing portion 71, power consumption and the like can be minimized and drying can be efficiently performed. Additionally, due to the fact that just enough drying is performed, the burden on the user can be minimized and nail printing that is expedited and that has a beautiful finish can be realized.

Particularly, in the present embodiment, the drying condition determination portion 813 determines the drying condition in accordance with the application range of the ink to be applied to the nail T.

While the ink application range differs depending on the size of the nail T and the nail design to be applied to the nail T, the drying operations can be performed in accordance with the ink application range and, therefore, the drying operations can be performed efficiently and effectively without unnecessary blowing. As a result, warm air can be blown and drying can be performed regardless of the nail design that is to be drawn and regardless of the size of the nail on which the drawing is to be performed.

The embodiment described above is for the purpose of elucidating the present invention and is not to be construed as limiting the present invention. The invention can of course be altered and improved without departing from the gist thereof.

For example, in the second embodiment, an example of a case has been described in which the drying condition determination portion 813 determines the drying condition in accordance with the application range of the ink to be applied to the nail. However, the technique by which the drying condition determination portion 813 determines the drying condition in accordance with the distribution state of the effective dots where the discharging of the ink from the ink jet drawing portion 71 is to be performed in cases where the drawing is to be performed by the ink jet drawing portion 71 is not limited thereto.

For example, the drying condition determination portion 813 may determine the drying condition in accordance with an amount of the ink to be applied to the nail T.

Figure 12A:
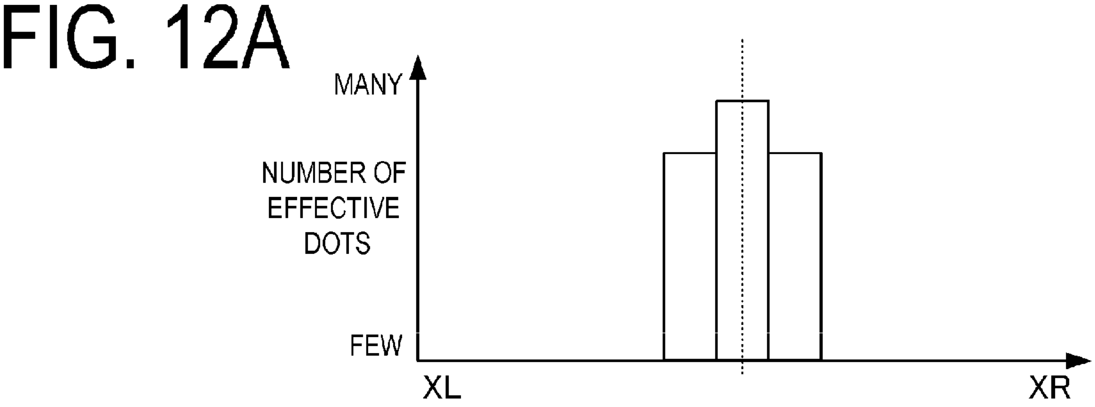
FIGS. 12A to 12C are explanatory drawings illustrating examples of drying parameters in cases where drying control is performed in accordance with an ink application amount.
Figure 12B:
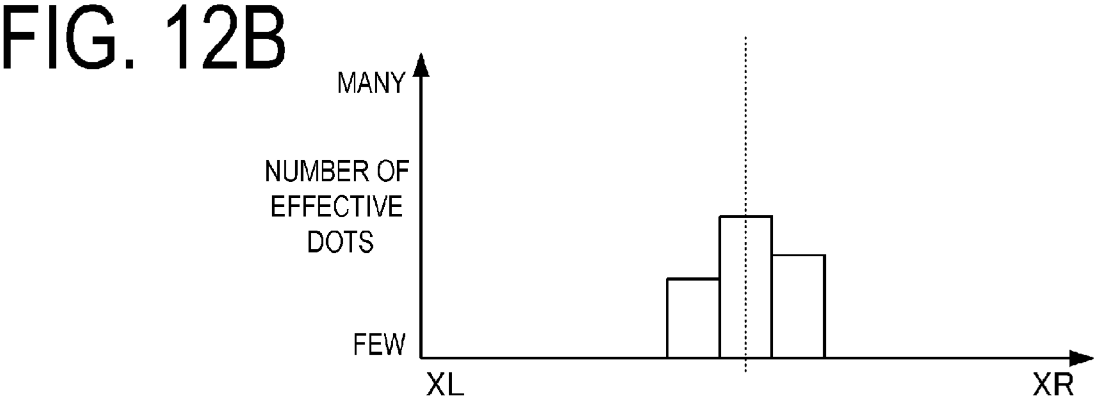
Figure 12C:
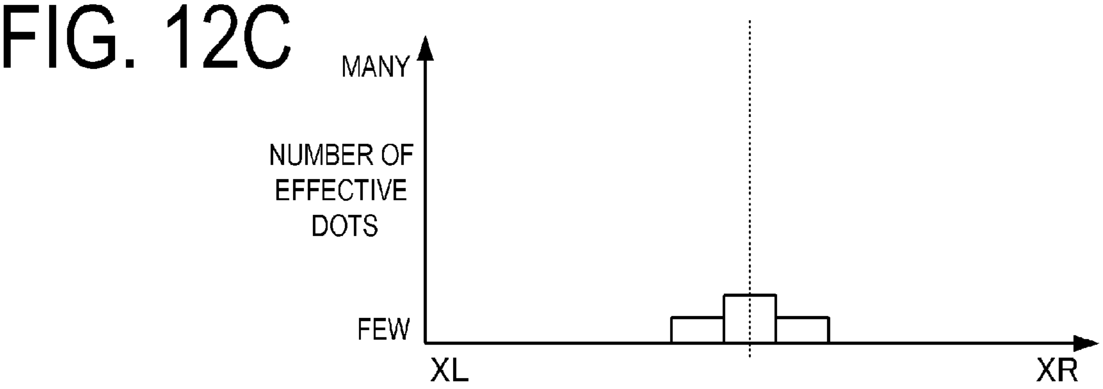

FIGS. 12A to 12C are histograms in which the coordinates in the X direction (XL to XR) are shown on the horizontal axis and the number of effective dots of the output data at each X coordinate is shown on the vertical axis.

Note that in FIGS. 12A to 12C, the vertical line depicted as a dashed line represents the center in the X direction of the aperture of the drying unit 90.

In FIGS. 12A to 12C, the spreading (the application range) of the ink in the X direction (the lateral direction) is substantially the same, but in FIG. 12A the ink amount is high, in FIG. 12C the ink amount is low, and in FIG. 12B the ink amount is medium.

Even when the spreading of ink in the X direction (the lateral direction) is the same, the ink amount is greater in cases where the concentration of the ink is high (e.g. where the discharged amount of ink is great or many types of ink are mixed); and the ink amount is less in cases where ink is applied thinly, cases where the design is to be drawn using a single CMY color, and the like.

In the present embodiment, in cases where the histogram is such as in FIG. 12A, it is preferable that the blowing volume for drying be increased, because if the blowing volume is small it will be impossible to rapidly dry the ink. As such, the drying condition determination portion 813 sets drying parameters for a large ink amount.

Additionally, in cases where the histogram is such as in FIG. 12C, it is preferable that the blowing volume for drying be reduced, because the interior of the apparatus will become exceedingly hot and power consumption efficiency will be poor if the blowing volume is high. As such, the drying condition determination portion 813 sets drying parameters for a small ink amount.

Additionally, in cases where the histogram is such as in FIG. 12B, it is preferable that the blowing volume for drying be set to a medium range, because the interior of the apparatus will become exceedingly hot and power consumption efficiency will be poor if the blowing volume is excessively increased. On the other hand, if only a small amount of blowing is performed, it will take time to dry the ink. As such, the drying condition determination portion 813 sets drying parameters for a medium ink amount.

The lower value at which the ink amount is determined to be the "large ink amount", and the upper value at which the ink amount is determined to be the "small ink amount" are appropriately set in accordance with the usage specifications of the apparatus. For example, thresholds are set beforehand and the drying condition determination portion 813 references these thresholds to perform the determination and, thereby, sets the drying parameters.

Figure 13:
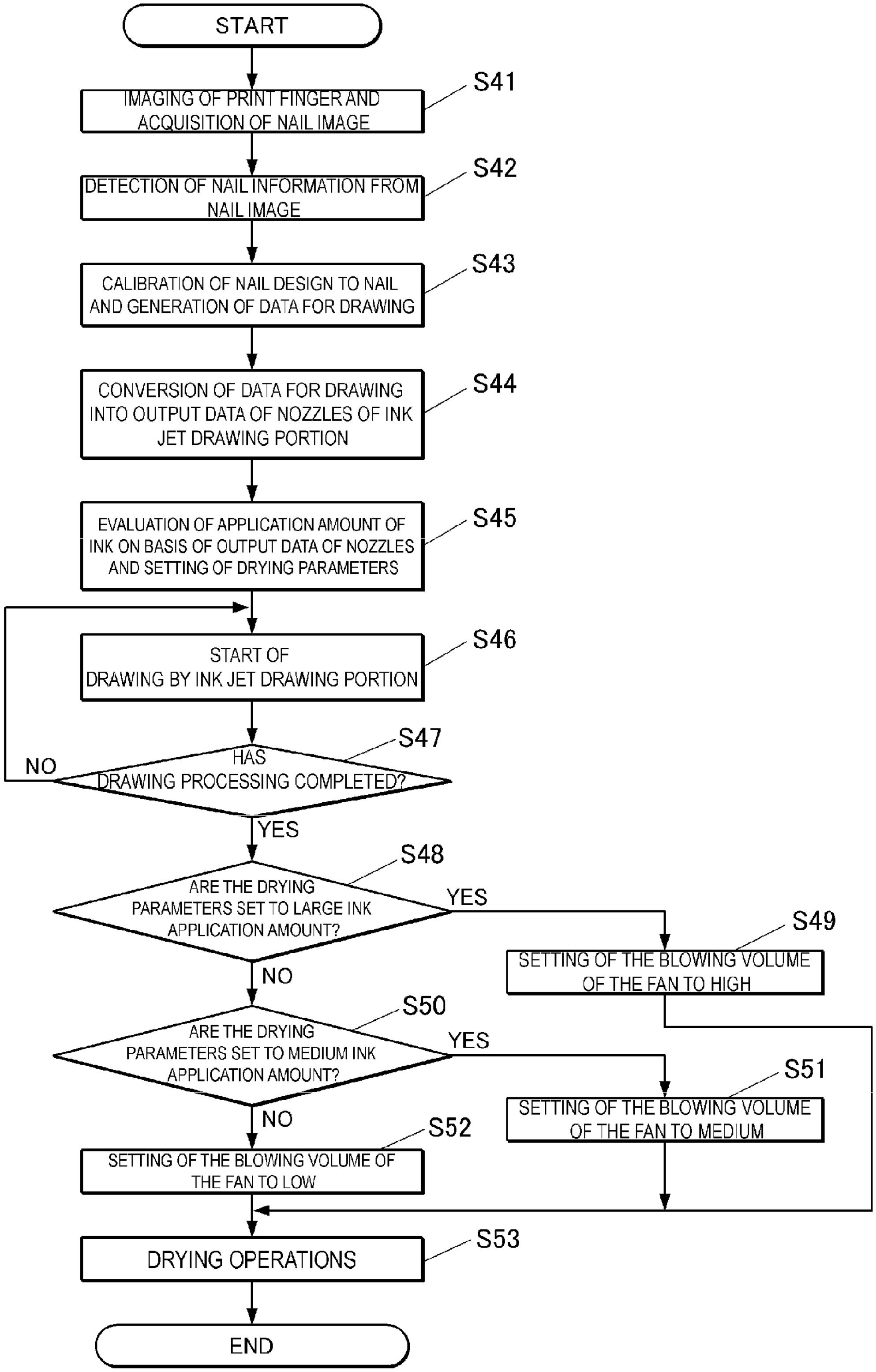
FIG. 13 is a flowchart showing drawing processing in a modified example of the second embodiment of the present invention.

FIG. 13 shows a flow chart of a case where the drying condition is determined in accordance with the amount of ink.

Note that step S41 to step S44 in FIG. 13 are the same as step S21 to step S24 in FIG. 11 of the second embodiment and, therefore, description thereof is omitted.

Upon the generation of the output data of the nozzles, the drying condition determination portion 813 evaluates the ink application amount on the basis of the output data and sets the drying parameters for the large application amount, the drying parameters for the medium application amount, or the drying parameters for the small application amount (step S45).

Moreover, upon generation of the output data of the nozzles, the drawing control portion 817 outputs the output data to the drawing unit 40 and causes the head movement portion 49 to operate and move the drawing head 43 to a position above the surface of the nail T or, rather, to a position above the drawing start position of the selected nail design, thus starting the drawing (step S46).

Specifically, in cases where drawing by using the ink jet drawing portion 71, the drawing control portion 817 controls the ink discharging operations from the nozzles of the ink jet drawing portion 71 and discharges ink from the nozzles in accordance with the drawing data.

The drawing control portion 817 determines whether or not the drawing processing is completed for the entire nail T (step S47) and, in cases where it is determined that the drawing processing is not complete (step S47; NO), the processing is repeated from step S46. Additionally, in cases where it is determined that the drawing processing is complete (step S47; YES), the drawing processing for that nail T is completed.

Upon completion of the drawing processing, the drying control portion 814 determines whether or not the drying parameters are set to the "large ink application amount" (step S48). Then, in cases where the drying parameters are set to the "large ink application amount" (step S48; YES), the drying control portion 814 sets the fan 92 to a blowing volume of "high" (step S49).

On the other hand, in cases where the drying parameters are not set to the "large ink application amount" (step S48; NO), the drying control portion 814 determines whether or not the drying parameters are set to the "medium ink application amount" (step S50). Then, in cases where the drying parameters are set to the "medium ink application amount" (step S50; YES), the drying control portion 814 sets the fan 92 to a blowing volume of "medium" (step S51).

On the other hand, in cases where the drying parameters are not set to the "medium ink application amount" (step S50; NO), the drying control portion 814 determines that the drying parameters are set to the "small ink application amount", and sets the fan 92 to a blowing volume of "low" (step S52).

As described above, upon completion of the setting of the fan 92 in accordance with the drying condition determined by the drying condition determination portion 813 in accordance with the application amount of the ink to be applied to the surface of the nail T (the drawing object), the drying control portion 814 performs the drying operations by causing the heater 91 and the fan 92 to operate (step S53).

Specifically, in cases where the blowing volume of the fan 92 is set to high, the drying control portion 814 controls the operations of the fan 92 such as to increase the blowing volume by increasing the voltage value applied to the fan 92. Additionally, in cases where the blowing volume of the fan 92 is set to medium, the drying control portion 814 controls the operations of the fan 92 such as to set the blowing volume to a medium level by setting the voltage value applied to the fan 92 to the standard level. Additionally, in cases where the blowing volume of the fan 92 is set to low, the drying control portion 814 controls the operations of the fan 92 such as to reduce the blowing volume by reducing the voltage value applied to the fan 92.

Note that the drying control portion 814 is not limited to controlling the blowing volume of the fan 92, and may also control a blowing time of the fan 92. Additionally, the drying control portion 814 may control a combination of the blowing volume and the blowing time of the fan 92.

In this case, just enough of the drying operations can be performed in accordance with the ink amount, power can be conserved, and highly efficient drying can be realized.

Note that the determination of the drying condition by the drying condition determination portion 813 is not limited to that recited herein.

For example, the drying condition determination portion 813 may perform the determination of the drying condition while taking into consideration both the ink application range described in the second embodiment and the ink application amount described above. In this case, the drying control portion 814 may control a part or a combination of all of the blowing volume of the fan 92, the blowing time of the fan 92, and/or the blowing width by the wind direction adjusting unit 93 in accordance with the drying condition determined by the drying condition determination portion 813. As a result of such a configuration, greater suitability of drying control as a result of combining the various conditions and controlled components is anticipated.

Additionally, in the second embodiment, an example of a case has been described in which the drawing is performed by the ink jet drawing portion 71. Even in cases where the drawing is performed by the pen 41, the drying condition determination portion 813 may be configured to determine the drying condition in accordance with the ink application range and/or the ink application amount, provided that the ink application range in the X direction, the amount of applied overlapping ink, and the like can be found.

Additionally, in the embodiment described above, an example of a case has been described in which the drying control portion 814 controls the wind direction adjusting unit 93 so as to change the range across which the wind generated by the fan 92 is spread, in accordance with the determination by the drying condition determination portion 813. However, the control object by the drying control portion 814 in accordance with the results of the determination by the drying condition determination portion 813 is not limited to the wind direction adjusting unit 93.

For example, the drying control portion 814 may be configured to control the heater 91 and the fan 92 so as to change the time of the drying operations by the drying control portion 90, in accordance with the determination by the drying condition determination portion 813.

In this case, in cases where the drying condition determination portion 813 has determined that the drying time may be shortened, by setting the drying time shorter, rapid drying processing can be performed, the burden on the user can be lightened, and power consumption can be reduced.

Additionally, for example, the drying control portion 814 may be configured to control the heater 91 so as to change the temperature at the time of the drying operations by the drying control portion 90, in accordance with the determination by the drying condition determination portion 813.

In this case, in cases where the drying condition determination portion 813 has determined that the drying is possible at a relatively lower temperature, by setting the temperature of the heater 91 lower, the burden on the user can be lightened and power consumption can be reduced.

Additionally, for example, the drying control portion 814 may be configured to control the fan 92 so as to change air flow during the drying operations by the drying control portion 90, in accordance with the determination by the drying condition determination portion 813.

In this case, in cases where the drying condition determination portion 813 has determined that the air flow may be reduced, by setting the air flow blown by the fan 92 to less, power consumption can be reduced; and, in cases where it has been determined that the air flow should be increased, by setting the air flow blown by the fan 92 to more, rapid drying processing can be performed.

Furthermore, in the first embodiment, an example of a case has been described in which the drying condition determination portion 813 determines the size of the area of the surface of the nail T to which the ink has been applied as the drying condition, and the drying control portion 814 controls the drying operations of the drying unit 90 in accordance with this determination result. However, the drying condition that the drying condition determination portion 813 determines is not limited thereto.

For example, the drying condition may be the ease of drying of the liquid material, namely the ink.

That is, differences occur in the ease of drying of the ink due to the components and materials contained therein. For example, generally, the ink drawn by the ink jet drawing portion 71 has properties that make it dry easier than the ink drawn by the pen 41. Additionally, the ease of drying of inks stored in the pen 41 differs as well, depending on the type of ink. As such, the drying control portion 814 may control the drying operations by the drying unit 90 so as, for example, to shorten the drying time in cases where the drawing is performed using an easily drying ink and lengthen the drying time in cases where the drawing is performed using an ink that does not easily dry.

Additionally, even with ink that is drawn using the ink jet drawing portion 71, the ease of drying varies depending on the type of ink (e.g. ink color types of cyan (C), magenta (M), and yellow (Y)). This is because the content of ink pigment in the solvent is different for each ink color. As such, for example, an index may be provided in which each ink is indexed according to ease of drying, wherein an index score of 100 is assigned to an ink that dries one-minute after application of 1 ml thereof; the ease of drying for each type of ink may be calculated in accordance with this index; and, the drying control portion 814 may control the drying operations by the drying unit 90 on the basis of these calculation results.

Note that information of the type of ink used in the drawing may be included in the data of the nail design, or the drying control portion 814 may be configured to acquire information related to the type of ink stored in the pen 41 at the point in time when the pen 41 to be used in the drawing is selected.

Additionally, the drying condition that the drying condition determination portion 813 determines may be the ink application amount. That is, for example, even in cases where the same type of ink is applied on the same area, the ink will dry easily when applied thinly and the ink will not dry easily when applied thickly. As such, if the thickness of the ink to be applied varies, the ease of drying will vary correspondingly. On this point, in cases where the ink application amount is set as the drying condition, suitable drying operations can be performed by taking the thickness of the ink to be applied and the like into consideration.

Note that the control object and the content of control of the drying unit 90 by the drying condition determination portion 814, and the specific content of the determination object by the drying condition determination portion 813, namely the drying condition, is not limited to those described herein.

It is possible to appropriately combine a part or all of the control objects and the contents of control of the drying unit 90 by the drying condition determination portion 814 and the specific content of the determination object by the drying condition determination portion 813, namely the drying condition.

Note that in cases where performing only other control content without adjusting the wind direction, a configuration is possible in which the wind direction adjusting unit 93 is not provided in the drying unit 90.

As such, by appropriately combining a plurality of control contents and drying conditions that must be considered, drying conditions can be realized that are even more efficient and which are just enough to perform the drying.

For example, as described in the present embodiment, in cases where the size of the area of the surface of the nail T to which the ink has been applied is determined as the drying condition, and the wind direction adjusting unit 93 is controlled in accordance with these determination results, the air flow may also be adjusted.

Specifically, in cases where the area of the surface of the nail T to which the ink has been applied is determined to be "large", and the wind direction adjusting unit 93 is controlled such that the aperture of the drying unit 90 widens, the wind will spread an amount corresponding to the widening of the aperture and, therefore, control of the fan 92 is also performed so as to increase the air flow. Conversely, in cases where the area of the surface of the nail T to which the ink has been applied is determined to be "small", and the wind direction adjusting unit 93 is controlled such that the aperture of the drying unit 90 narrows, wind hits a narrow portion in a focused manner and, therefore, control of the fan 92 is also performed so as to reduce the air flow. Thus, the air flow blown per unit area may be adjusted so as to be substantially the same, regardless of the size of the area of the drying object.

Additionally, for example, the ease of drying of the ink may also be determined as the drying condition along with the size of the area of the surface of the nail T to which the ink has been applied.

In this case, for example, in cases where the ink does not easily dry, in combination with the adjustment of the wind direction, the drying time may be lengthened, the drying temperature may be raised, and/or the air flow may be increased.

Additionally, in cases where the drying temperature has been raised or the air flow has been increased, the drying time may be shortened a corresponding amount.

As such, by determining using a combination of various types of drying conditions or combining the various types of drying operation contents controlled by the drying conditions, drying operations can be performed that are more suitable and free of waste.

Additionally, in each of the embodiments described above, an example of a case has been described in which, the wind direction adjusting unit 93 is configured such that the widening angle of the blades 94 is adjusted by adjusting the length of the rods 971 of the power cylinders 97. However, the configuration by which the angle of the blades 94 is adjusted is not limited thereto.

For example, as illustrated in FIGS. 14A to 14D, a configuration is possible in which two movable members *99a* and *99b* are provided on an inside of a frame-like front surface member 98 in the wind direction adjusting unit 93 and, of four of the blades 94 of which first ends are attached to the back surface member 95, second ends of the two blades on the left side (the left side in FIGS. 14A to 14D) are rotatably attached to the movable member *99a*, and second ends of the two blades on the right side (the right side in FIGS. 14A to 14D) are rotatably attached to the movable member *99b*. In this case, the direction (angle) of the blades 94 is adjusted by moving the movable members *99a* and *99b* in the left-right direction (the left-right direction in FIGS. 14A to 14D). Note that various types of actuators such as power cylinders (not illustrated) that extend and contract in the lateral direction can be applied as a mechanism for moving the movable members 99*a* and 99*b*.

Figure 14A:
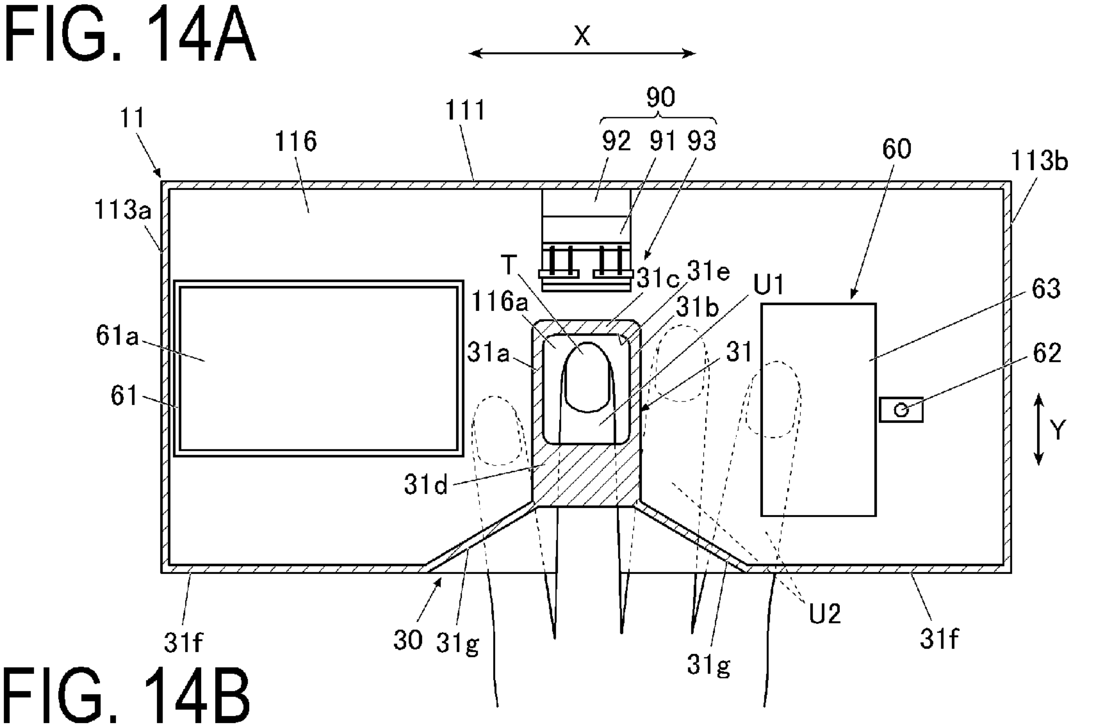
FIG. 14A is a plan view of a dividing wall in which a modified example of the drying unit is disposed.
Figure 14B:
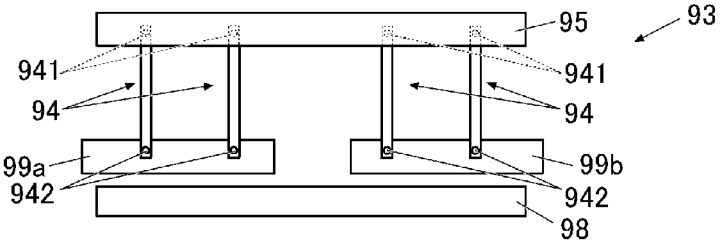
FIG. 14B is a top view illustrating an initial state of the wind direction adjusting unit.

In this case, for example, at the initial position, as illustrated in FIG. 14B, there is a slight gap between the movable members 99*a* and 99*b*, and the blades 94 are aligned in a direction that is substantially parallel with the finger insertion direction. As a result, the width of the aperture of the drying unit 90 is substantially the same as the width of the fan 92.

Figure 14C:
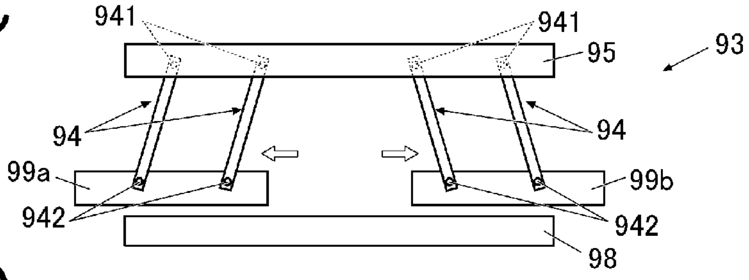
FIG. 14C is a top view illustrating the wind direction adjusting unit in a case where an aperture is largest.

In cases of widening the aperture of the drying unit 90, as illustrated in FIG. 14C, the movable members 99*a* and 99*b* are moved in directions away from each other (that is, the movable member 99*a* is moved in the left direction and the movable member 99*b* is moved in the right direction).

Figure 14D:
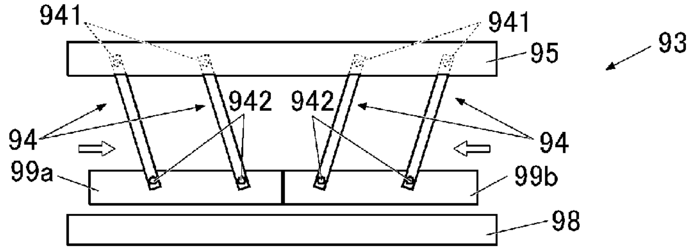
FIG. 14D is a top view illustrating the wind direction adjusting unit in a case where the aperture is smallest.

Conversely, in cases of narrowing the aperture of the drying unit 90, as illustrated in FIG. 14D, the movable members 99*a* and 99*b* are moved toward each other so as to come into contact with each other.

By configuring the wind direction adjusting unit 93 in this manner, even in cases where abundant space in the depth direction of the apparatus cannot be secured, provided that space in the width direction of the apparatus (the lateral direction in FIG. 14A) can be secured, a mechanism for adjusting the wind direction can be incorporated.

Additionally, in each of the embodiments described above, an example of a case has been described in which four of the blades 94 are provided in the wind direction adjusting unit 93, and the wind direction is adjusted by adjusting the widening angle of the blades 94. However, the technique by which the wind direction is adjusted is not limited thereto. The configuration by which the angle of the blades 94 is adjusted is also not limited thereto.

For example, a configuration is possible in which a plate-like member having a plurality of slits is provided in a front surface portion of the wind direction adjusting unit 93, and adjustment of the wind direction is performed by configuring the slits at portions other than those through which wind is to be blown to be arbitrarily blockable.

Additionally, in each of the embodiments described above, an example of a case has been described in which all of the operations and actions are performed by the single nail printing apparatus 1. However, the configuration by which the nail printing apparatus 1 is operated is not limited thereto.

Figure 15:
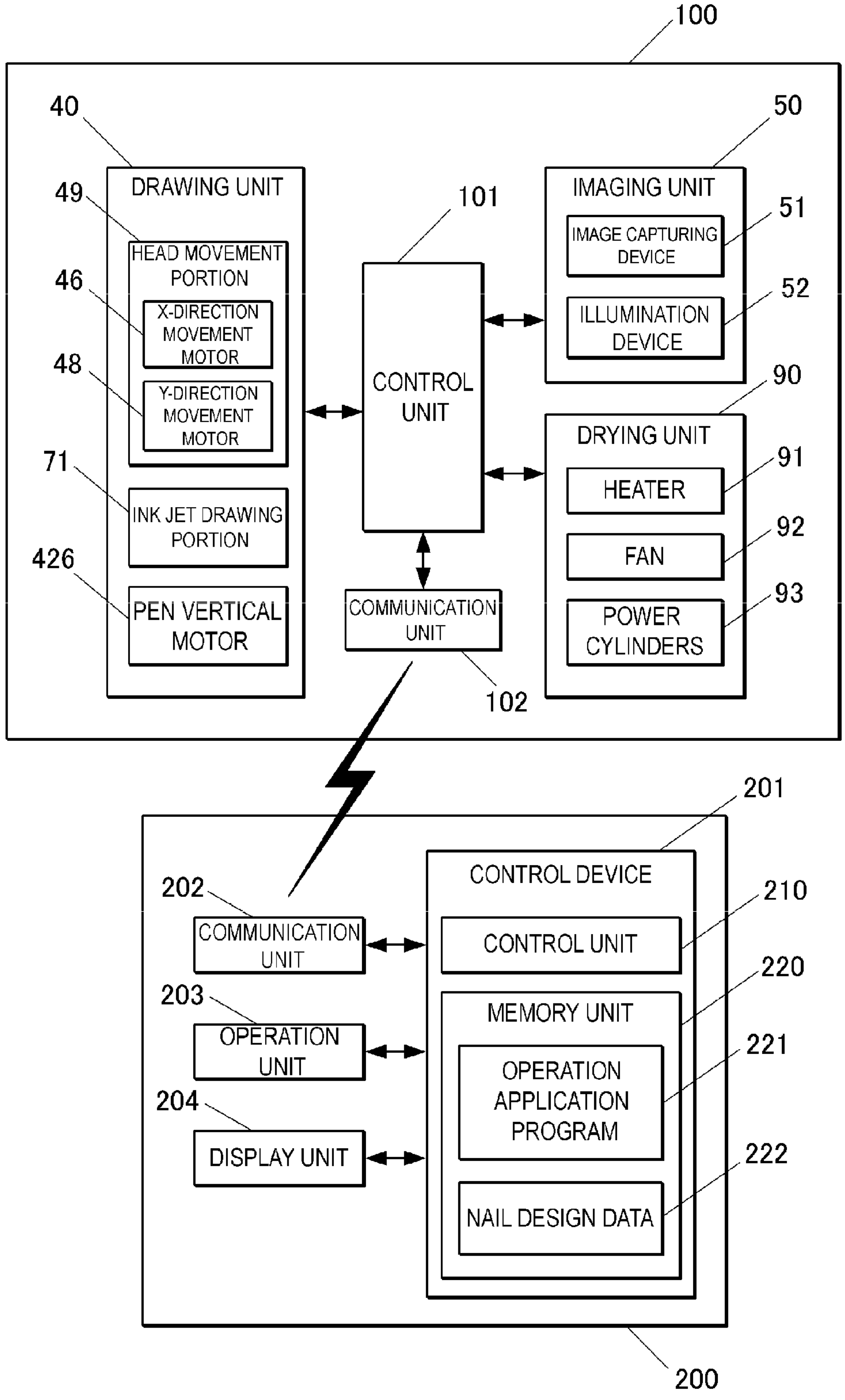
FIG. 15 is a main constituent block diagram showing a control configuration of the drawing apparatus according to the modified example of the embodiment of the present invention.

For example, as shown in FIG. 15, a configuration is possible in which a drawing apparatus (drawing apparatus unit) is provided that includes a nail printing apparatus main body 100 that is provided with the drawing unit 40, the imaging unit 50, and the drying unit 90 as in the embodiments described above, a control unit 101 for operating these components, and a communication unit 102 capable of communication with an external device; and an operating terminal device 200 that communicates with the nail printing apparatus main body 100, for performing various types of processing, operations/commands, and the like.

In this case, the operating terminal device 200 is provided with a control device 201 that includes a control unit 210 for performing image processing and the like and a memory unit 220 in which an operation application program 221, nail design data 222, and the like are stored; a communication unit 202 for performing communication between the nail printing apparatus main body 100 or the like and the external device; an operation unit 203 where a user can perform input operations for various operations/commands; and a display unit 204 capable of displaying various images, command screens, and the like.

In cases where this configuration is adopted, images and the like imaged by the imaging unit 50 are sent from the nail printing apparatus main body 100 to the operating terminal device 200 via the communication units 102 and 202. Additionally, the detection of nail information and generation of the image data for drawing based on the nail information, the conversion of the image data for drawing to the output data of the nozzles, the determination of the drying condition, and the like are performed in the control unit 201 of the operating terminal device 200. Furthermore, the control unit 101 of the nail printing apparatus main body 100 controls the drawing unit 40, the drying unit 90, and the like on the basis of these results and, thus, causes the drawing operations and the drying operations to be performed.

Note that, in this case, the nail design data is not limited to being stored in the memory unit 220 in the operating terminal device 200, and a configuration is possible in which the nail design data can be acquired from an external storage device via various types of communication networks.

Additionally, in the embodiments described above, an example of a case is described in which the drawing head 43 is provided with one pen holder 42, but the number of pen holders 42 provided in the drawing head 43 is not limited to one. For example, a configuration is possible in which two or more pen holders 42 are provided and two or more pens 41 for drawing are held.

Additionally, in the embodiments described above, an example of a case is described in which a user appropriately manually replaces the pen 41 held in the pen holder 42. However, a configuration is possible in which a waiting space is provided where the pens 41 stand by in a home area 60 or the like, and the required pen 41 is automatically acquired from the waiting space and inserted into the pen holder 42 by a pen replacing mechanism (not illustrated).

Additionally, in the embodiments described above, an example of a case is described in which the image capturing apparatus 51 and the illumination device 52 are mounted to the drawing head 43, but the positions at which the image capturing apparatus 51 and the illumination device 52 are provided are not limited thereto.

For example, the image capturing device 51 and the illumination device 52 may be fixedly disposed to a ceiling portion or the like of the nail printing apparatus 1. In this case, it is preferable that two or more of the image capturing apparatus 51 be provided at offset positions in order to capture two or more nail images from different positions/angles for detecting the shape, curvature, and the like of the nail T as the nail information.

Additionally, in the embodiments described above, an example of a case is described in which the curvature and the like of the nail T is detected as the nail information and the drawing data is generated on the basis thereof. However, the detection of the curvature and the like of the nail T is not an essential constituent of the present invention. For example, in cases where it is sufficient to find the approximate position of the nail T on which the drawing is to be performed such as a case where one point pattern is drawn at roughly the middle of the nail T, it is not necessary to precisely recognize the shape, curvature, and the like of the nail T, and drawing can be performed without detecting the nail shape and the like.

Additionally, in the embodiments described above, an example of the nail printing apparatus 1 in which one finger at a time is inserted and successive drawing is performed. However, a configuration is possible in which drawing is performed consecutively on a plurality of fingers without inserting and removing each finger.

In this case, for example, by broadening the operating range of the pen 41 and the ink jet drawing portion 71 so as to enlarge the drawable area, drawings are performed consecutively on the nail of each finger in a state where a plurality of the print fingers U1 is simultaneously inserted. Moreover, in cases where performing drawing consecutively on a plurality of nails T in this manner, the wind direction adjusting unit 93 is adjusted such that the aperture of the drying unit 90 is widest, and the wind generated by the fan 92 reaches all of the nails T.

The present invention has been described on the basis of specific embodiments, but it goes without saying that the technical scope of the present invention is not limited to these embodiments. The embodiments described above are not to be construed as limiting the scope of the present invention and include the scope of the invention recited in the claims and equivalents thereto.

It is obvious to a person skilled in the art that various modifications and improvements can be made to the specific embodiments described above, and it is obvious from the recitations of the claims that aspects including such modification and improvements are encompassed within the technical scope of the present invention.

The invention claimed is:

1. A drawing apparatus comprising:

a drawing device that performs drawing on at least one nail of a finger or toe by applying a liquid material to the nail;

a dryer that performs a drying operation for drying the liquid material that has been applied to the nail; and a processor that controls the drying operation of the dryer, wherein the dryer comprises a fan that generates a wind flowing in a direction intersecting a width direction of the nail, and a wind direction adjusting device that adjusts a range where the wind flows in the width direction to one of a plurality of different ranges, and wherein the processor controls the dryer so that the range where the wind flows in the width direction, which is adjusted by the wind direction adjusting device, corresponds to an application range where the liquid material is to be applied to the nail.

2. The drawing apparatus according to claim 1, wherein the processor controls a blowing volume of the wind generated by the fan in accordance with the adjusting of the range where the wind flows in the width direction by the wind direction adjusting device.

3. The drawing apparatus according to claim 1, wherein the processor controls a blowing volume of the wind generated by the fan in accordance with an amount of the liquid material that is to be applied to the drawing object.

4. The drawing apparatus according to claim 1, wherein the processor controls the dryer so that the range where the wind flows in the width direction, which is adjusted by the wind direction adjusting device, corresponds to a distribution in the width direction of the application range where the liquid material is to be applied.

5. The drawing apparatus according to claim 1, wherein the processor controls a blowing time of the wind generated by the fan in accordance with an ease of drying based on a type of the liquid material.

6. The drawing apparatus according to claim 1, wherein:

the dryer further comprises a heater; and the processor controls the heater so as to change a temperature of the wind generated by the dryer, in accordance with an ease of drying based on a type of the liquid material.

7. A drawing method for a drawing apparatus, the drawing apparatus comprising (i) a drawing device that performs drawing on at least one nail of a finger or toe by applying a liquid material to the nail, and (ii) a dryer including a fan that generates a wind flowing in a direction intersecting a width direction of the nail, and a wind direction adjusting device that adjusts a range where the wind flows in the width direction to one of a plurality of different ranges, the dryer performing a drying operation for drying the liquid material applied to the nail, and the drawing method comprising:

before drawing by the drawing device, controlling the drying so that the range where the wind flows in the width direction, which is adjusted by the wind direction adjusting device, corresponds to an application range where the liquid material is to be applied to the nail.

8. The drawing method according to claim 7, further comprising controlling a blowing volume of the wind generated by the fan in accordance with the adjusting of the range where the wind flows in the width direction by the wind direction adjusting device.

9. The drawing method according to claim 7, further comprising controlling a blowing volume of the wind by the fan in accordance with an amount of the liquid material that is to be applied to the nail.

10. The drawing method according to claim 7, further comprising controlling the dryer so that the range where the wind flows in the width direction, which is adjusted by the wind direction adjusting device, corresponds to a distribution in the width direction of the application range where the liquid material is to be applied.

11. The drawing method according to claim 7, further comprising controlling a blowing time of the wind generated by the fan in accordance with an ease of drying based on a type of the liquid material.

12. The drawing method according to claim 7, wherein:

the dryer further includes a heater; and the method further comprises controlling the heater so as to change a temperature of the wind generated by the dryer, in accordance with an ease of drying based on a type of the liquid material.

* * * * *